US012565755B2

(12) United States Patent
Misaki

(10) Patent No.: US 12,565,755 B2
(45) Date of Patent: Mar. 3, 2026

(54) WORK MACHINE AND OPERATING DEVICE FOR WORK MACHINE

(71) Applicant: SUMITOMO CONSTRUCTION MACHINERY CO., LTD., Tokyo (JP)

(72) Inventor: Youji Misaki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 116 days.

(21) Appl. No.: 18/474,617

(22) Filed: Sep. 26, 2023

(65) Prior Publication Data

US 2024/0011243 A1 Jan. 11, 2024

Related U.S. Application Data

(63) Continuation of application No. PCT/JP2022/016307, filed on Mar. 30, 2022.

(30) Foreign Application Priority Data

Mar. 31, 2021 (JP) ................................ 2021-062319
Mar. 31, 2021 (JP) ................................ 2021-062449

(51) Int. Cl.
*E02F 9/22* (2006.01)
*E02F 9/20* (2006.01)
*G05G 5/05* (2006.01)

(52) U.S. Cl.
CPC ............ *E02F 9/2004* (2013.01); *G05G 5/05* (2013.01); *E02F 9/2285* (2013.01); (Continued)

(58) Field of Classification Search
None
See application file for complete search history.

(56) References Cited

U.S. PATENT DOCUMENTS 5,434,785 A 7/1995 Myeong-hun et al.
10,626,575 B2 * 4/2020 Kobayashi ............ E02F 9/2004
(Continued)

FOREIGN PATENT DOCUMENTS

JP S64-056631 U 4/1989
JP H03-100922 U 10/1991
(Continued)

OTHER PUBLICATIONS

JP-2000089847-A machine translation to English from PE2Esearch (Year: 2024).*

(Continued)

*Primary Examiner* — Michael Quandt
(74) *Attorney, Agent, or Firm* — IPUSA, PLLC

(57) ABSTRACT

A work machine includes an operating device operable in a first direction and a second direction, a hydraulic pump configured to supply hydraulic oil, a hydraulic actuator, a directional control valve configured to control the hydraulic oil flowing from the hydraulic pump to the hydraulic actuator, and a hardware processor configured to control the directional control valve based on the amount of operation of the operating device. The operating device is structured or placed such that a force is likely to escape in the first direction when the operating device is operated in the second direction. The operating device is configured such that a dead area increases with respect to the first direction in which the force is likely to escape.

10 Claims, 17 Drawing Sheets

(52) U.S. Cl.
CPC ........... *E02F 9/2292* (2013.01); *E02F 9/2296* (2013.01); *G05G 2505/00* (2013.01)

(56) References Cited

U.S. PATENT DOCUMENTS

| | | | | |
|---|---|---|---|---|
| 11,319,693 | B2 * | 5/2022 | Takahashi | E02F 9/2004 |
| 2017/0121943 | A1 | 5/2017 | Lee et al. | |
| 2022/0042279 | A1 | 2/2022 | Takahashi et al. | |
| 2022/0134926 | A1 | 5/2022 | Miyamoto et al. | |

FOREIGN PATENT DOCUMENTS

| | | | | | |
|---|---|---|---|---|---|
| JP | H07-083350 | | | 3/1995 | |
| JP | H09-279637 | | | 10/1997 | |
| JP | H10-091263 | | | 4/1998 | |
| JP | H11296247 | A | * | 10/1999 | |
| JP | 2000089847 | A | * | 3/2000 | |
| JP | 2005-100225 | | | 4/2005 | |
| JP | 2010-066962 | | | 3/2010 | |
| JP | 2013-14981 | | | 1/2013 | |
| JP | 2017057644 | A | * | 3/2017 | E02F 3/28 |
| JP | 2019-060474 | | | 4/2019 | |
| JP | 2020-051166 | | | 4/2020 | |
| WO | 2019/116486 | | | 6/2019 | |
| WO | 2020/179429 | | | 9/2020 | |
| WO | 2020/179565 | | | 9/2020 | |

OTHER PUBLICATIONS

JP-2017057644-A machine translation to English from PE2Esearch (Year: 2024).*

JP H11296247 A machine translation to English from espacenet (Year: 2025).*

International Search Report for PCT/JP2022/016307 mailed on Jun. 14, 2022.

* cited by examiner

WORK MACHINE AND OPERATING DEVICE FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2022/016307, filed on Mar. 30, 2022 and designating the U.S., which claims priority to Japanese Patent Application Nos. 2021-062319 and 2021-062449, both filed on Mar. 31, 2021. The entire contents of the foregoing applications are incorporated herein by reference.

BACKGROUND

Technical Field

The present disclosure relates to work machines and operating devices for work machines.

Description of Related Art

A work machine including a lower traveling structure, an upper swing structure swingable relative to the lower traveling structure, an attachment attached to the upper swing structure, a swing hydraulic motor that swings the upper swing structure, and a hydraulic actuator that drives the attachment is known. Furthermore, an operating device for a hydraulic work machine is known.

SUMMARY

According to an aspect, a work machine includes an operating device operable in a first direction and a second direction, a hydraulic pump configured to supply hydraulic oil, a hydraulic actuator, a directional control valve configured to control the hydraulic oil flowing from the hydraulic pump to the hydraulic actuator, and a hardware processor configured to control the directional control valve based on the amount of operation of the operating device. The operating device is structured or placed such that a force is likely to escape in the first direction when the operating device is operated in the second direction. The operating device is configured such that a dead area increases with respect to the first direction in which the force is likely to escape.

DETAILED DESCRIPTION

Figure 1:
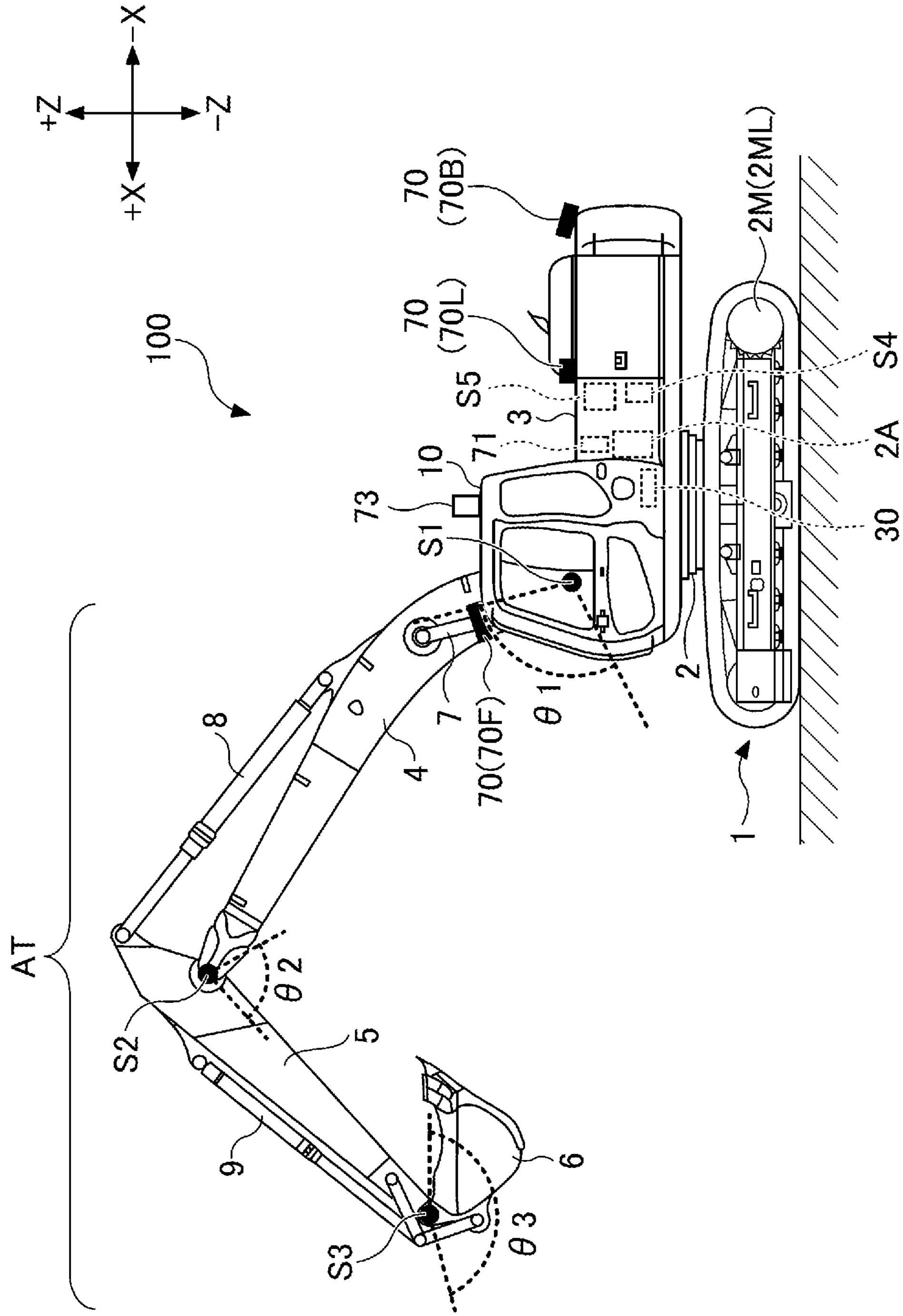
FIG. 1 is a side view of a shovel according to an embodiment of the present invention.

An operating device for operating a work machine is operable in, for example, left and right directions and front and back directions. One hydraulic actuator moves commensurately with the amount of operation in the left and right directions, and another hydraulic actuator moves commensurately with the amount of operation in the front and back directions. Therefore, while the operating device is operated in one direction, the operating device may be accidentally operated in another direction.

According to an embodiment, a work machine and an operating device for a work machine with improved operability.

An embodiment of the present invention is described below with reference to the drawings. In the drawings, the same or corresponding configurations are referred to using the same or corresponding numerals and a description thereof is omitted.

Figure 2:
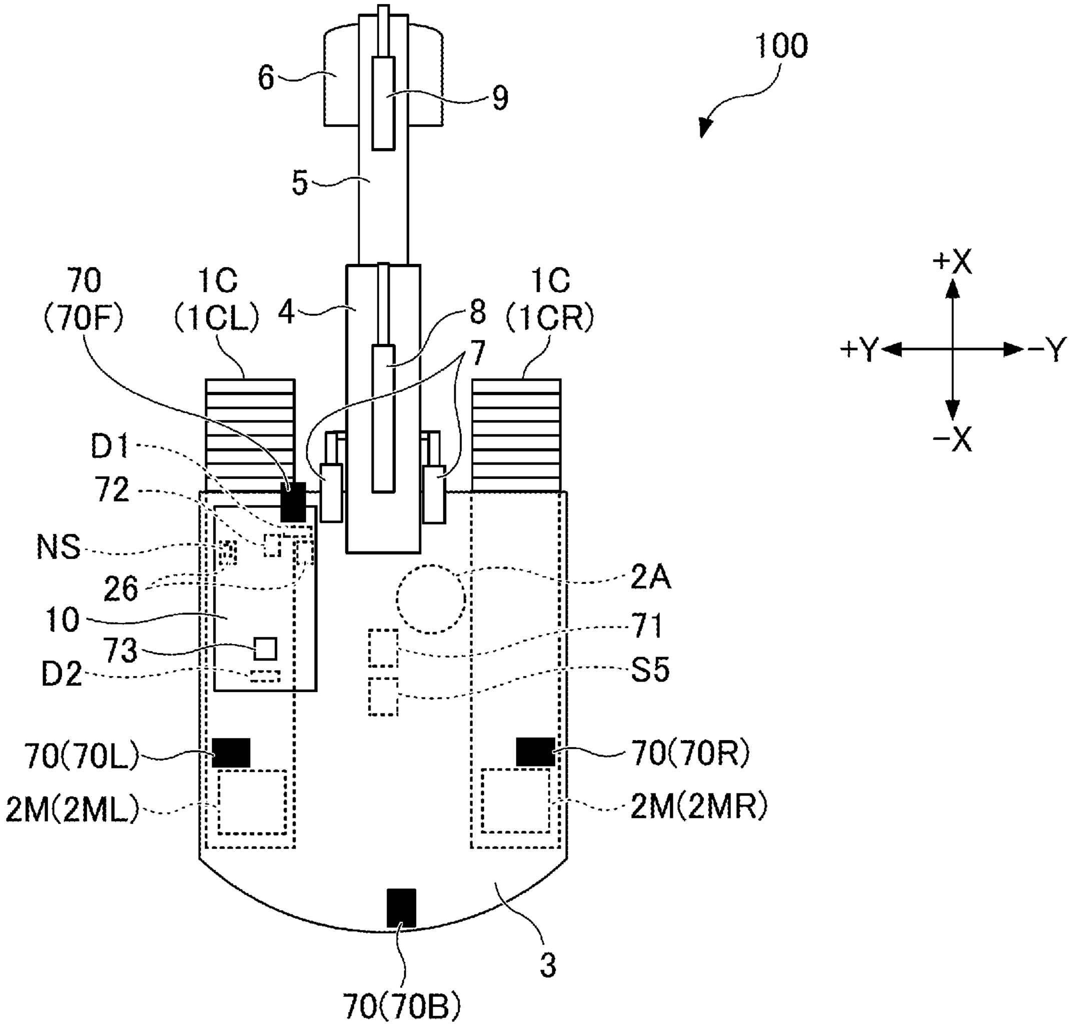
FIG. 2 is a plan view of the shovel of FIG. 1.

First, a shovel (work machine) 100 serving as an excavator according to an embodiment of the present invention is described with reference to FIGS. 1 and 2. FIG. 1 is a side view of the shovel 100, and FIG. 2 is a plan view of the shovel 100.

According to this embodiment, a lower traveling structure 1 of the shovel 100 includes a crawler 1C. The crawler 1C is driven by a travel hydraulic motor 2M serving as a travel actuator mounted on the lower traveling structure 1. Specifically, the crawler 1C includes a left crawler 1CL and a right crawler 1CR. The left crawler 1CL is driven by a left travel hydraulic motor 2ML and the right crawler 1CR is driven by a right travel hydraulic motor 2MR.

An upper swing structure 3 is swingably mounted on the lower traveling structure 1 via a swing mechanism 2. The swing mechanism 2 is driven by a swing hydraulic motor 2A serving as a swing actuator mounted on the upper swing structure 3.

A boom 4 is attached to the upper swing structure 3. An arm 5 is attached to the distal end of the boom 4. A bucket 6 serving as an end attachment is attached to the distal end of the arm 5. The boom 4, the arm 5, and the bucket 6 constitute an excavation attachment AT, which is an example of an attachment. The boom 4 is driven by a boom cylinder 7. The arm 5 is driven by an arm cylinder 8. The bucket 6 is driven by a bucket cylinder 9. The boom cylinder 7, the arm cylinder 8, and the bucket cylinder 9 constitute an attachment actuator.

The boom 4 is supported in such a manner as to be pivotable upward and downward relative to the upper swing structure 3. A boom angle sensor S1 is attached to the boom 4. The boom angle sensor S1 can detect a boom angle θ1, which is the pivot angle of the boom 4. The boom angle θ1 is, for example, a rise angle from the most lowered position of the boom 4. Therefore, the boom angle θ1 is maximized when the boom 4 is most raised.

The arm 5 is supported in such a manner as to be pivotable relative to the boom 4. An arm angle sensor S2 is attached to the arm 5. The arm angle sensor S2 can detect an arm angle θ2, which is the pivot angle of the arm 5. The arm angle θ2 is, for example, an opening angle from the most closed position of the arm 5. Therefore, the arm angle θ2 is maximized when the arm 5 is most opened.

The bucket 6 is supported in such a manner as to be pivotable relative to the arm 5. A bucket angle sensor S3 is attached to the bucket 6. The bucket angle sensor S3 can detect a bucket angle θ3, which is the pivot angle of the bucket 6. The bucket angle θ3 is, for example, an opening angle from the most closed position of the bucket 6. Therefore, the bucket angle θ3 is maximized when the bucket 6 is most opened.

Each of the boom angle sensor S1, the arm angle sensor S2, and the bucket angle sensor S3, which is constituted of a combination of an acceleration sensor and a gyroscope according to the embodiment of FIG. 1, may also be constituted of an acceleration sensor alone. The boom angle sensor S1 may also be a stroke sensor attached to the boom cylinder 7 and may also be a rotary encoder, a potentiometer, an inertial measurement unit, or the like. The same is the case with the arm angle sensor S2 and the bucket angle sensor S3.

A cabin 10 serving as a cab is provided and a power source such as an engine 11 is mounted on the upper swing structure 3. Furthermore, a space recognition device an orientation detector 71, a positioning device 73, a machine body tilt sensor S4, a swing angular velocity sensor S5, etc., are attached to the upper swing structure 3. An operating device 26, a controller 30, an information input device 72, a display device D1, a sound output device D2, etc., are provided in the cabin 10. In this specification, for convenience, the side on which the excavation attachment AT is attached is defined as the front side and the side on which a counterweight is attached is defined as the back side on the upper swing structure 3.

The space recognition device 70 is configured to recognize an object present in a three-dimensional space around the shovel 100. Furthermore, the space recognition device 70 is configured to calculate a distance from the space recognition device 70 or the shovel 100 to the recognized object. Examples of the space recognition device 70 include an ultrasonic sensor, a millimeter wave radar, a monocular camera, a stereo camera, a LIDAR, a distance image sensor, and an infrared sensor. According to the example illustrated in FIGS. 1 and 2, the space recognition device 70 includes a front sensor 70F attached to the front end of the upper surface of the cabin 10, a back sensor 70B attached to the rear end of the upper surface of the upper swing structure 3, a left sensor 70L attached to the left end of the upper surface of the upper swing structure 3, and a right sensor 70R attached to the right end of the upper surface of the upper swing structure 3. An upward sensor that recognizes an object present in a space above the upper swing structure 3 may be attached to the shovel 100.

The orientation detector 71 is configured to detect information on the relative relationship between the orientation of the upper swing structure 3 and the orientation of the lower traveling structure 1. For example, the orientation detector 71 may be constituted of a combination of a geomagnetic sensor attached to the lower traveling structure 1 and a geomagnetic sensor attached to the upper swing structure 3. The orientation detector 71 may also be constituted of a combination of a GNSS receiver attached to the lower traveling structure 1 and a GNSS receiver attached to the upper swing structure 3. The orientation detector 71 may also be a rotary encoder, a rotary position sensor, or the like. When the upper swing structure 3 is configured to be driven to swing by a swing motor generator, the orientation detector 71 may be constituted of a resolver. For example, the orientation detector 71 may be attached to a center joint provided in relation to the swing mechanism 2 that achieves relative rotation between the lower traveling structure 1 and the upper swing structure 3.

The orientation detector 71 may also be constituted of a camera attached to the upper swing structure 3. In this case, the orientation detector 71 performs known image processing on an image captured by the camera attached to the upper swing structure 3 (an input image) to detect an image of the lower traveling structure 1 included in the input image. The orientation detector 71 identifies the longitudinal direction of the lower traveling structure 1 by detecting the image of the lower traveling structure 1 using a known image recognition technique and derives the angle famed between the direction of the longitudinal axis of the upper swing structure 3 and the longitudinal direction of the lower traveling structure 1. The direction of the longitudinal axis of the upper swing structure 3 is derived from the attachment position of the camera. Because the crawler 1C protrudes from the upper swing structure 3, the orientation detector 71 can identify the longitudinal direction of the lower traveling structure 1 by detecting an image of the crawler 1C. In this case, the orientation detector 71 may be integrated into the controller 30.

The information input device 72 is configured to enable an operator of the shovel 100 to input information to the controller 30. According to this embodiment, the information input device 72 is a switch panel installed near the display part of the display device D1. The information input device 72 may also be a touchscreen placed over the display part of the display device D1 or a sound input device such as a microphone placed in the cabin 10. The information input device 72 may also be a communications device. In this case, the operator can input information to the controller via a communications terminal such as a smartphone.

The positioning device 73 is configured to measure a current location. According to this embodiment, the positioning device 73 is a GNSS receiver and detect the position of the upper swing structure 3 to output the detected value to the controller 30. The positioning device 73 may also be a GNSS compass. In this case, the positioning device 73 can detect the position and the orientation of the upper swing structure 3.

The machine body tilt sensor S4 is configured to detect the tilt of the upper swing structure 3 relative to a predetermined plane. According to this embodiment, the machine body tilt sensor S4 is an acceleration sensor that detects the tilt angle about the longitudinal axis and the tilt angle about the lateral axis of the upper swing structure 3 relative to a horizontal plane. The longitudinal axis and the lateral axis of the upper swing structure 3, for example, pass through the central point of the shovel 100 that is a point on the swing axis of the shovel 100, crossing each other at right angles.

The swing angular velocity sensor S5 is configured to detect the swing angular velocity of the upper swing structure 3. According to this embodiment, the swing angular velocity sensor S5 is a gyroscope. The swing angular velocity sensor S5 may also be a resolver, a rotary encoder, or the like. The swing angular velocity sensor S5 may also detect swing speed. The swing speed may be calculated from swing angular velocity.

In the following, at least one of the boom angle sensor S1, the arm angle sensor S2, the bucket angle sensor S3, the machine body tilt sensor S4, and the swing angular velocity sensor S5 is also referred to as a pose detector. The pose of the excavation attachment AT is detected based on, for example, the output of each of the boom angle sensor S1, the arm angle sensor S2, and the bucket angle sensor S3.

The display device D1 is a device that displays information. According to this embodiment, the display device D1 is a liquid crystal display installed in the cabin 10. The display device D1 may also be the display of a communications terminal such as a smartphone.

The sound output device D2 is a device that outputs a sound. The sound output device D2 includes at least one of a device that outputs a sound to the operator in the cabin 10 and a device that outputs a sound to a worker outside the cabin 10. The sound output device D2 may also be a loudspeaker attached to a communications terminal.

The operating device 26 is a device that the operator uses to operate actuators. The operating device 26 is installed in the cabin 10 to be usable by the operator seated in an operator seat.

The controller 30 is a control device for controlling the shovel 100. According to this embodiment, the controller 30 is constituted of a computer including a CPU, a RAM, an NVRAM, and a ROM. The controller 30 reads programs corresponding to functional elements such as an information obtaining part 30*a* and a control part 30*b* from the ROM, loads them into the RAM, and causes the CPU to execute processes corresponding to the functional elements. Thus, the functional elements are implemented by software. At least one of the functional elements, however, may be implemented by hardware or firmware. The individual functional elements, which are distinguished for convenience of description, are equal in being part of the controller 30 and do not have to be physically distinguishable.

Figure 3:
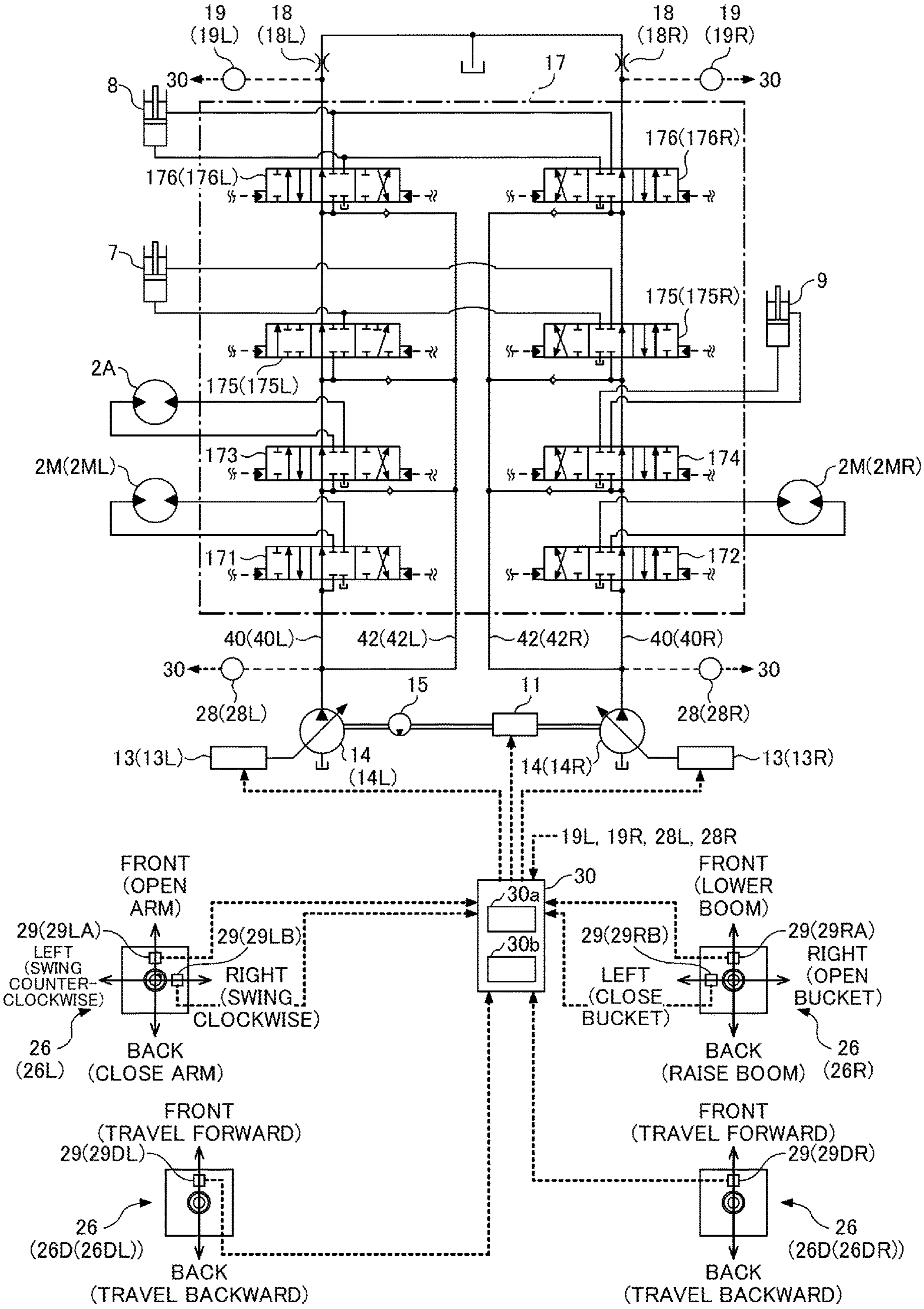
FIG. 3 is a diagram illustrating an example configuration of a hydraulic system installed in the shovel of FIG. 1.

Next, an example configuration of a hydraulic system installed in the shovel 100 is described with reference to FIG. 3. FIG. 3 is a diagram illustrating an example configuration of a hydraulic system installed in the shovel 100. In FIG. 3, a mechanical power transmission system, a hydraulic oil line, a pilot line, and an electrical control system are indicated by a double line, a solid line, a dashed line, and a dotted line, respectively.

The hydraulic system of the shovel 100 mainly includes the engine 11, a regulator 13, a main pump 14, a pilot pump 15, a control valve unit 17, the operating device 26, a discharge pressure sensor 28, an operation sensor 29, and the controller 30.

In FIG. 3, the hydraulic system is configured to be able to circulate hydraulic oil from the main pump 14 driven by the engine 11 up to a hydraulic oil tank by way of a center bypass conduit 40 or a parallel conduit 42.

The engine 11 is a drive source of the shovel 100. According to this embodiment, the engine 11 is, for example, a diesel engine that operates to maintain a predetermined rotational speed. The output shaft of the engine 11 is connected to the input shaft of each of the main pump 14 and the pilot pump 15.

The main pump 14 is configured to be able to supply hydraulic oil to the control valve unit 17 via a hydraulic oil line. According to this embodiment, the main pump 14 is a swash plate variable displacement hydraulic pump.

The regulator 13 is configured to be able to control the discharge quantity of the main pump 14. According to this embodiment, the regulator 13 controls the discharge quantity of the main pump 14 by adjusting the tilt angle of the swash plate of the main pump 14 in accordance with a control command from the controller 30.

The pilot pump 15 is configured to be able to supply hydraulic oil to hydraulic control devices (for example, the pilot ports of directional control valves 171 through 176 described below) via a pilot line 25 (see FIG. 4 described below). According to this embodiment, the pilot pump 15 is a fixed displacement hydraulic pump. The pilot pump 15 may be omitted. In this case, the function carried by the pilot pump 15 may be implemented by the main pump 14. That is, the main pump 14 may have the function of supplying hydraulic oil to hydraulic control devices after reducing the pressure of the hydraulic oil with a throttle or the like, apart from the function of supplying hydraulic oil to the control valve unit 17.

The control valve unit 17 is a hydraulic control device that controls the hydraulic system in the shovel 100. According to this embodiment, the control valve unit 17 includes the directional control valves 171 through 176. The directional control valve 175 includes a directional control valve 175L and a directional control valve 175R. The directional control valve 176 includes a directional control valve 176L and a directional control valve 176R. The control valve unit 17 is configured to be able to selectively supply hydraulic oil discharged by the main pump 14 to one or more hydraulic actuators through the directional control valves 171 through 176. The directional control valves 171 through 176 control, for example, the flow rate of hydraulic oil flowing from the main pump 14 to hydraulic actuators and the flow rate of hydraulic oil flowing from hydraulic actuators to the hydraulic oil tank. The hydraulic actuators include the boom cylinder 7, the arm cylinder 8, the bucket cylinder 9, the left travel hydraulic motor 2ML, the right travel hydraulic motor 2MR, and the swing hydraulic motor 2A.

The operating device 26 is a device that the operator uses to operate actuators. The operating device 26 includes, for example, an operating lever and an operating pedal. The actuators include at least one of a hydraulic actuator and an electric actuator. According to this embodiment, an electric operation system including an electric operating lever may be employed. The amount of lever operation of an electric operating lever is input to the controller 30 as an electric signal. Furthermore, solenoid valves (hydraulic control valves 31X1 and 31X2 described below with reference to FIG. 4) are placed one between each of the pilot ports of each control valve and the pilot pump 15. The solenoid valves are configured to operate in response to an electric signal from the controller 30. According to this configuration, when manual operation using an electric operating lever is performed, the controller 30 can move each control valve within the control valve unit 17 by increasing or decreasing a pilot pressure by controlling a solenoid valve with an electric signal corresponding to the amount of lever operation. Each control valve may be constituted of a solenoid spool valve. In this case, the solenoid spool valve operates in accordance with an electric signal from the controller 30 corresponding to the amount of lever operation of an electric operating lever.

The discharge pressure sensor 28 is configured to be able to detect the discharge pressure of the main pump 14. According to this embodiment, the discharge pressure sensor 28 outputs the detected value to the controller 30.

The operation sensor 29 is configured to be able to detect the details of the operator's operation of the operating device 26. According to this embodiment, the operation sensor 29 detects the direction of operation and the amount of operation of the operating device 26 corresponding to each actuator and outputs the detected value to the controller 30. For example, the operation sensor 29 is an angle sensor that detects the angle of operation of an operating lever. The operation details of the operating device 26 may be detected using a sensor other than an angle sensor.

The main pump 14 includes a left main pump 14L and a right main pump 14R. The left main pump 14L circulates hydraulic oil to the hydraulic oil tank by way of a left center bypass conduit 40L or a left parallel conduit 42L. The right main pump 14R circulates hydraulic oil to the hydraulic oil tank by way of a right center bypass conduit 40R or a right parallel conduit 42R.

The left center bypass conduit 40L is a hydraulic oil line that passes through the directional control valves 171, 173, 175L and 176L placed in the control valve unit 17. The right center bypass conduit 40R is a hydraulic oil line that passes through the directional control valves 172, 174, 175R and 176R placed in the control valve unit 17.

The directional control valve 171 is a spool valve that switches the flow of hydraulic oil to supply hydraulic oil discharged by the left main pump 14L to the left travel hydraulic motor 2ML and discharge hydraulic oil discharged by the left travel hydraulic motor 2ML to the hydraulic oil tank.

The directional control valve 172 is a spool valve that switches the flow of hydraulic oil to supply hydraulic oil discharged by the right main pump 14R to the right travel hydraulic motor 2MR and discharge hydraulic oil discharged by the right travel hydraulic motor 2MR to the hydraulic oil tank.

The directional control valve 173 is a spool valve that switches the flow of hydraulic oil to supply hydraulic oil discharged by the left main pump 14L to the swing hydraulic motor 2A and discharge hydraulic oil discharged by the swing hydraulic motor 2A to the hydraulic oil tank.

The directional control valve 174 is a spool valve that switches the flow of hydraulic oil to supply hydraulic oil discharged by the right main pump 14R to the bucket cylinder 9 and discharge hydraulic oil in the bucket cylinder 9 to the hydraulic oil tank.

The directional control valve 175L is a spool valve that that switches the flow of hydraulic oil to supply hydraulic oil discharged by the left main pump 14L to the boom cylinder 7. The directional control valve 175R is a spool valve that that switches the flow of hydraulic oil to supply hydraulic oil discharged by the right main pump 14R to the boom cylinder 7 and discharge hydraulic oil in the boom cylinder 7 to the hydraulic oil tank.

The directional control valve 176L is a spool valve that switches the flow of hydraulic oil to supply hydraulic oil discharged by the left main pump 14L to the arm cylinder 8 and discharge hydraulic oil in the arm cylinder 8 to the hydraulic oil tank.

The directional control valve 176R is a spool valve that switches the flow of hydraulic oil to supply hydraulic oil discharged by the right main pump 14R to the arm cylinder 8 and discharge hydraulic oil in the arm cylinder 8 to the hydraulic oil tank.

The left parallel conduit 42L is a hydraulic oil line that parallels the left center bypass conduit 40L. The left parallel conduit 42L is configured to be able to supply hydraulic oil to a directional control valve further downstream when the flow of hydraulic oil through the left center bypass conduit 40L is restricted or blocked by any of the directional control valves 171, 173 and 175L. The right parallel conduit 42R is a hydraulic oil line that parallels the right center bypass conduit 40R. The right parallel conduit 42R is configured to be able to supply hydraulic oil to a directional control valve further downstream when the flow of hydraulic oil through the right center bypass conduit 40R is restricted or blocked by any of the directional control valves 172, 174 and 175R.

The regulator 13 includes a left regulator 13L and a right regulator 13R. The left regulator 13L controls the discharge quantity of the left main pump 14L by adjusting the tilt angle of the swash plate of the left main pump 14L in accordance with the discharge pressure of the left main pump 14L. Specifically, the left regulator 13L, for example, reduces the discharge quantity of the left main pump 14L by adjusting the tilt angle of its swash plate according to an increase in the discharge pressure of the left main pump 14L. The same is the case with the right regulator 13R. This is for preventing the absorbed power (for example, absorbed horsepower) of the main pump 14 expressed as the product of discharge pressure and discharge quantity from exceeding the output power (for example, output horsepower) of the engine 11.

The operating device 26 includes a left operating lever 26L, a right operating lever 26R, and travel levers 26D. The travel levers 26D include a left travel lever 26DL and a right travel lever 26DR.

The left operating lever 26L is used for swing operation and for operating the arm 5. The left operating lever 26L is operated forward or backward to apply a control pressure commensurate with the amount of lever operation to a pilot port of the directional control valve 176, using hydraulic oil discharged by the pilot pump 15. The left operating lever 26L is operated rightward or leftward to apply a control pressure commensurate with the amount of lever operation to a pilot port of the directional control valve 173, using hydraulic oil discharged by the pilot pump 15.

Specifically, the left operating lever 26L is operated in an arm closing direction to introduce hydraulic oil into the right pilot port of the directional control valve 176L and introduce hydraulic oil into the left pilot port of the directional control valve 176R. Furthermore, the left operating lever 26L is operated in an arm opening direction to introduce hydraulic oil into the left pilot port of the directional control valve 176L and introduce hydraulic oil into the right pilot port of the directional control valve 176R. Furthermore, the left operating lever 26L is operated in a counterclockwise swing direction to introduce hydraulic oil into the left pilot port of the directional control valve 173, and is operated in a clockwise swing direction to introduce hydraulic oil into the right pilot port of the directional control valve 173.

The right operating lever 26R is used to operate the boom 4 and operate the bucket 6. The right operating lever 26R is operated forward or backward to apply a control pressure commensurate with the amount of lever operation to a pilot port of the directional control valve 175, using hydraulic oil discharged by the pilot pump 15. The right operating lever 26R is operated rightward or leftward to apply a pilot pressure commensurate with the amount of lever operation to a pilot port of the directional control valve 174, using hydraulic oil discharged by the pilot pump 15.

Specifically, the right operating lever 26R is operated in a boom lowering direction to introduce hydraulic oil into the right pilot port of the directional control valve 175R. Furthermore, the right operating lever 26R is operated in a boom raising direction to introduce hydraulic oil into the right pilot port of the directional control valve 175L and introduce hydraulic oil into the left pilot port of the directional control valve 175R. Furthermore, the right operating lever 26R is operated in a bucket closing direction to introduce hydraulic oil into the left pilot port of the directional control valve 174, and is operated in a bucket opening direction to introduce hydraulic oil into the right pilot port of the directional control valve 174.

The travel levers 26D are used to operate the crawler 1C. Specifically, the left travel lever 26DL is used to operate the left crawler 1CL. The left travel lever 26DL may be configured to operate together with a left travel pedal. The left travel lever 26DL is operated forward or backward to apply a control pressure commensurate with the amount of lever operation to a pilot port of the directional control valve 171, using hydraulic oil discharged by the pilot pump 15. The right travel lever 26DR is used to operate the right crawler 1CR. The right travel lever 26DR may be configured to operate together with a right travel pedal. The right travel lever 26DR is operated forward or backward to apply a pilot pressure commensurate with the amount of lever operation to a pilot port of the directional control valve 172, using hydraulic oil discharged by the pilot pump 15.

The discharge pressure sensor 28 includes a discharge pressure sensor 28L and a discharge pressure sensor 28R. The discharge pressure sensor 28L detects the discharge pressure of the left main pump 14L, and outputs the detected value to the controller 30. The same is the case with the discharge pressure sensor 28R.

The operation sensor 29 includes operation sensors 29LA, 29LB, 29RA, 29RB, 29DL and 29DR. The operation sensor 29LA detects the details of the operator's forward or backward operation on the left operating lever 26L in the form of pressure, and outputs the detected value to the controller 30. Examples of the details of operation include the direction of lever operation and the amount of lever operation (the angle of lever operation).

Likewise, the operation sensor 29LB detects the details of the operator's rightward or leftward operation on the left operating lever 26L, and outputs the detected value to the controller 30. The operation sensor 29RA detects the details of the operator's forward or backward operation on the right operating lever 26R, and outputs the detected value to the controller 30. The operation sensor 29RB detects the details of the operator's rightward or leftward operation on the right operating lever 26R, and outputs the detected value to the controller 30. The operation sensor 29DL detects the details of the operator's forward or backward operation on the left travel lever 26DL, and outputs the detected value to the controller 30. The operation sensor 29DR detects the details of the operator's forward or backward operation on the right travel lever 26DR, and outputs the detected value to the controller 30.

The controller 30 receives the output of the operation sensor 29 and outputs a control command to the regulator 13 to change the discharge quantity of the main pump 14 on an as-needed basis. Furthermore, the controller receives the output of a control pressure sensor 19 provided upstream of a throttle 18 and outputs a control command to the regulator 13 to change the discharge quantity of the main pump 14 on an as-needed basis. The throttle 18 includes a left throttle 18L and a right throttle 18R and the control pressure sensor 19 includes a left control pressure sensor 19L and a right control pressure sensor 19R.

The left throttle 18L is placed between the most downstream directional control valve 176L and the hydraulic oil tank in the left center bypass conduit 40L. Therefore, the flow of hydraulic oil discharged by the left main pump 14L is restricted by the left throttle 18L. The left throttle 18L generates a control pressure for controlling the left regulator 13L. The left control pressure sensor 19L is a sensor for detecting this control pressure, and outputs a detected value to the controller 30. The controller 30 controls the discharge quantity of the left main pump 14L by adjusting the tilt angle of the swash plate of the left main pump 14L according to this control pressure. The controller 30 decreases the discharge quantity of the left main pump 14L as this control pressure increases, and increases the discharge quantity of the left main pump 14L as this control pressure decreases. The discharge quantity of the right main pump 14R is likewise controlled.

Specifically, when the hydraulic system is in a standby state where no hydraulic actuators are operated in the shovel 100 as illustrated in FIG. 3, the hydraulic oil discharged by the left main pump 14L arrives at the left throttle 18L through the left center bypass conduit 40L. The flow of the hydraulic oil discharged by the left main pump 14L increases a control pressure generated upstream of the left throttle 18L. As a result, the controller 30 decreases the discharge quantity of the left main pump 14L to a minimum allowable discharge quantity to reduce pressure loss (pumping loss) during the passage of the hydraulic oil discharged by the left main pump 14L through the left center bypass conduit 40L. In contrast, when any of the hydraulic actuators is operated, the hydraulic oil discharged by the left main pump 14L flows into the operated hydraulic actuator via a directional control valve corresponding to the operated hydraulic actuator. The flow of the hydraulic oil discharged by the left main pump 14L decreases or becomes zero in amount arriving at the left throttle 18L to reduce the control pressure generated upstream of the left throttle 18L. As a result, the controller 30 increases the discharge quantity of the left main pump 14L to circulate sufficient hydraulic oil to the operated hydraulic actuator to ensure driving of the operated hydraulic actuator. The controller 30 likewise controls the discharge quantity of the right main pump 14R.

According to the above-described configuration, the hydraulic system of FIG. 3 can control unnecessary energy consumption in the main pump 14 in the standby state. The unnecessary energy consumption includes pumping loss that the hydraulic oil discharged by the main pump 14 causes in the center bypass conduit 40. Furthermore, in the case of actuating a hydraulic actuator, the hydraulic system of FIG. 3 can ensure that necessary and sufficient hydraulic oil is supplied from the main pump 14 to the hydraulic actuator to be actuated.

Next, the information obtaining part 30*a* and the control part 30*b*, which are functional elements of the controller 30, are described. The information obtaining part 30*a* is configured to obtain information on the shovel 100. According to this embodiment, the information obtaining part 30*a* is configured to obtain information on the shovel 100 from at least one of the boom angle sensor S1, the arm angle sensor S2, the bucket angle sensor S3, the machine body tilt sensor S4, the swing angular velocity sensor S5, a cylinder pressure sensor, swing pressure sensors (swing pressure sensors 27X1 and 27X2 described below with reference to FIG. 4), travel pressure sensors, a boom cylinder stroke sensor, an arm cylinder stroke sensor, a bucket cylinder stroke sensor, the discharge pressure sensor 28, the operation sensor 29, the space recognition device 70, the orientation detector 71, the information input device 72, the positioning device 73, and a communications device. The cylinder pressure sensor includes at least one of, for example, a boom rod pressure sensor, a boom bottom pressure sensor, an arm rod pressure sensor, an arm bottom pressure sensor, a bucket rod pressure sensor, and a bucket bottom pressure sensor.

The information obtaining part 30*a* obtains, for example, as information on the shovel 100, at least one of a boom angle, an arm angle, a bucket angle, a machine body tilt angle, a swing angular velocity, a boom rod pressure, a boom bottom pressure, an arm rod pressure, an arm bottom pressure, a bucket rod pressure, a bucket bottom pressure, a swing pressure, a travel pressure, a boom stroke amount, an arm stroke amount, a bucket stroke amount, the discharge pressure of the main pump 14, the operation (the direction of operation, the amount of operation) of the operating device 26, information on an object present in a three-dimensional space around the shovel 100, information on the relative relationship between the orientation of the upper swing structure 3 and the orientation of the lower traveling structure 1, information input to the controller and information on a current location.

Furthermore, the information obtaining part 30*a* obtains information on the motion of the shovel 100 based on the obtained information on the shovel 100. Examples of the information on the motion of the shovel 100 includes information on a motion that the shovel 100 is performing. Examples of the information on a motion that the shovel 100 is performing include a swing independent motion of swinging the upper swing structure 3, a boom raising and swing complex motion of swinging the upper swing structure 3 while raising the boom 4, a boom lowering and swing complex motion of swinging the upper swing structure 3 while lowering the boom 4, an arm opening and swing complex motion of swinging the upper swing structure 3 while opening the arm 5, an arm closing and swing complex motion of swinging the upper swing structure 3 while closing the arm 5, a bucket opening and swing complex motion of swinging the upper swing structure 3 while opening the bucket 6, and a bucket closing and swing complex motion of swinging the upper swing structure 3 while closing the bucket 6.

The control part 30*b* is configured to be able to control the motion of the shovel 100 based on the information obtained by the information obtaining part 30*a*.

Figure 4:
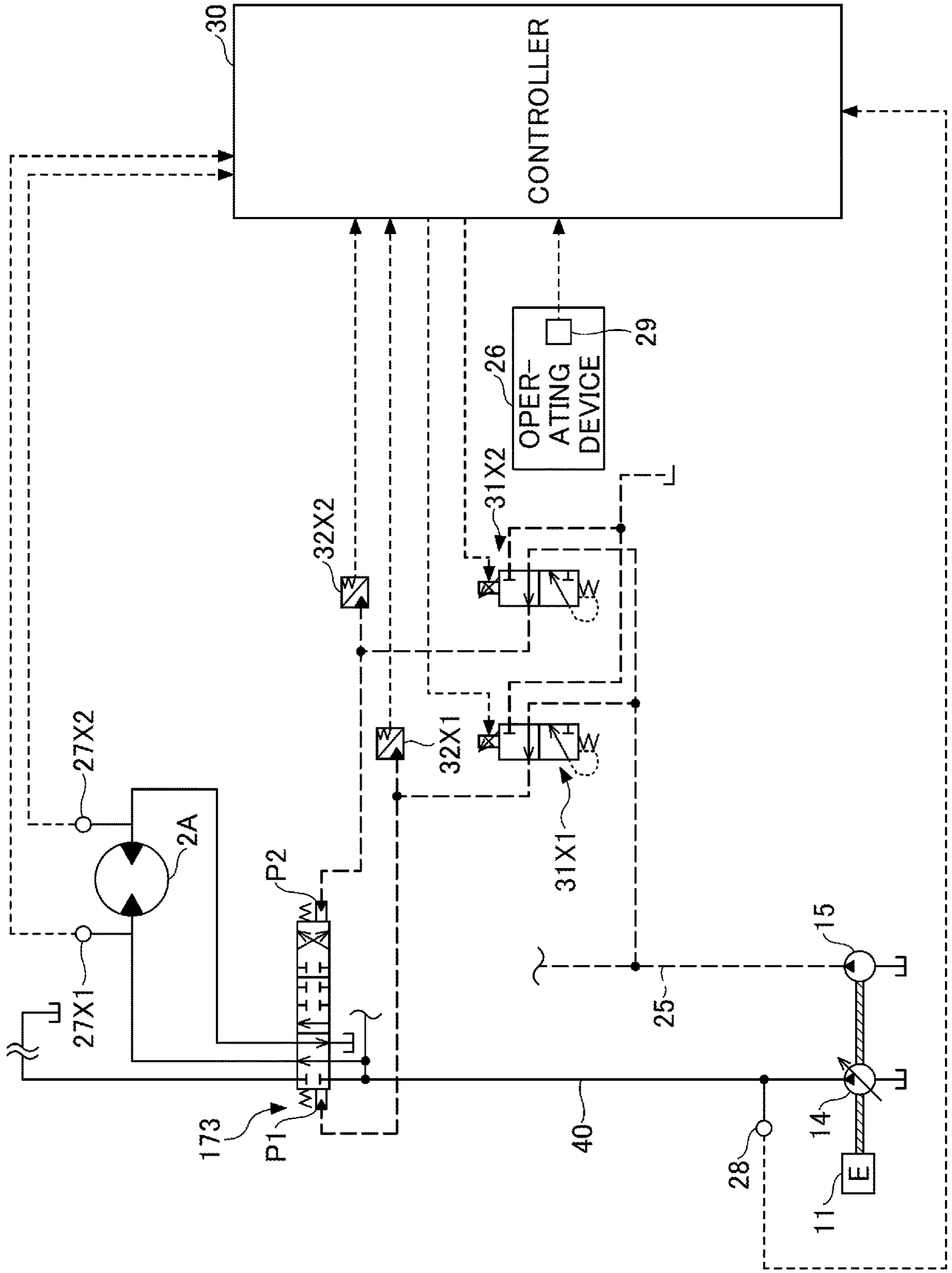
FIG. 4 is a diagram illustrating an example configuration of an electric operation system.

Next, an operation system of the shovel 100 is described using FIG. 4. FIG. 4 is a diagram illustrating an example configuration of an electric operation system. Specifically, the electric operation system of FIG. 4 is an example of a swing operation system. The electric operation system of FIG. 4 may be likewise applied to a boom operation system, an arm operation system, a bucket operation system, a travel operation system, etc.

The electric operation system is constituted mainly of the directional control valve 173 (see also FIG. 3) of the pilot pressure-actuated control valve unit 17, the operating device 26 serving as an electric operating lever, the hydraulic control valve 31X1 for counterclockwise swing operation, the hydraulic control valve 31X2 for clockwise swing operation, a pressure sensor 32X1, a pressure sensor 32X2, and the controller 30.

The directional control valve 173 controls the flow rate of hydraulic oil flowing into the swing hydraulic motor 2A, which is a hydraulic actuator, from the main pump 14. Specifically, the directional control valve 173 includes pilot ports P1 and P2 and is supplied with hydraulic oil (a pilot pressure) to the pilot port P1 or P2 to move a spool.

The operating device 26 serving as an electric operating lever includes the operation sensor 29 that detects the details of the operator's operation (the direction of operation and the amount of operation) of the operating device 26 and outputs the detected value to the controller 30.

The hydraulic control valve 31X1 is provided in the pilot line 25 that connects the pilot pump 15 and the pilot port P1 of the directional control valve 173 and supplies hydraulic oil (a pilot pressure) to the pilot port P1 of the directional control valve 173. Thereby, the hydraulic control valve 31X1 moves the spool of the directional control valve 173 from a neutral position to the side of one axial end (the right side in FIG. 4). The hydraulic oil supplied from the main pump 14 is supplied to the left port of the swing hydraulic motor 2A to be able to swing the upper swing structure 3 counterclockwise.

The hydraulic control valve 31X2 is provided in the pilot line 25 that connects the pilot pump 15 and the pilot port P2 of the directional control valve 173 and supplies hydraulic oil (a pilot pressure) to the pilot port P2 of the directional control valve 173. Thereby, the hydraulic control valve 31X2 moves the spool of the directional control valve 173 from the neutral position to the side of another axial end (the left side in FIG. 4). The hydraulic oil supplied from the main pump 14 is supplied to the right port of the swing hydraulic motor 2A to be able to swing the upper swing structure 3 clockwise.

The pressure sensor 32X1 detects the pressure of hydraulic oil on the secondary side of the hydraulic control valve 31X1. The pressure sensor 32X1 outputs the detected value to the controller 30.

The pressure sensor 32X2 detects the pressure of hydraulic oil on the secondary side of the hydraulic control valve 31X2. The pressure sensor 32X2 outputs the detected value to the controller 30.

The swing pressure sensor 27X1 detects the pressure of hydraulic oil at the left port (a load pressure during a counterclockwise swing) of the swing hydraulic motor 2A, which is a hydraulic actuator. The swing pressure sensor 27X1 outputs the detected value to the controller 30.

The swing pressure sensor 27X2 detects the pressure of hydraulic oil at the right port (a load pressure during a clockwise swing) of the swing hydraulic motor 2A, which is a hydraulic actuator. The swing pressure sensor 27X2 outputs the detected value to the controller 30.

The discharge pressure sensor 28 detects the discharge pressure of the main pump 14. The discharge pressure sensor 28 outputs the detected value to the controller 30.

The controller 30 can control the pilot pressure supplied to the pilot port P1 of the directional control valve 173 by controlling the hydraulic control valve 31X1 based on the pressure of hydraulic oil on the secondary side of the hydraulic control valve 31X1 detected by the pressure sensor 32X1. Furthermore, the controller 30 can control the pilot pressure supplied to the pilot port P2 of the directional control valve 173 by controlling the hydraulic control valve 31X2 based on the pressure of hydraulic oil on the secondary side of the hydraulic control valve 31X2 detected by the pressure sensor 32X2. That is, the controller 30 is configured to be able to control the spool stroke amount of the directional control valve 173 by controlling the hydraulic control valves 31X1 and 31X2.

The controller 30 controls the spool stroke amount of the directional control valve 173 by controlling the hydraulic control valves 31X1 and 31X2 based on the operation details (the direction of operation and the amount of operation) of the operating device 26 detected by the operation sensor 29. Furthermore, the controller 30 controls the spool stroke amount of the directional control valve 173 by controlling the hydraulic control valves 31X1 and 31X2 based on the operation details (the direction of operation and the amount of operation) of the operating device 26 detected by the operation sensor 29 and the discharge pressure of the main pump 14 detected by the discharge pressure sensor 28. Furthermore, the controller controls the spool stroke amount of the directional control valve 173 by controlling the hydraulic control valves 31X1 and 31X2 based on the operation details (the direction of operation and the amount of operation) of the operating device 26 detected by the operation sensor 29 and the pressure difference between the discharge pressure of the main pump 14 detected by the discharge pressure sensor 28 and the load pressure of the hydraulic actuator.

Figure 5:
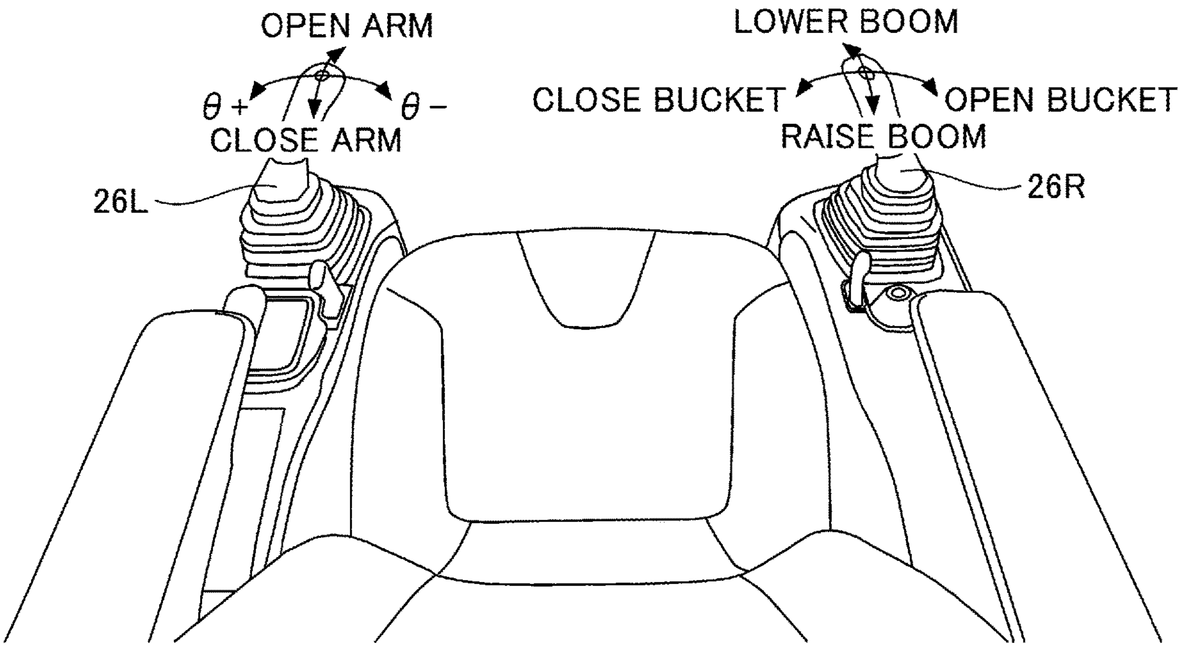
FIG. 5 is a top perspective view of an operator seat in a cabin.

Next, examples of the operating device 26 (the left operating lever 26L and the right operating lever 26R) provided in the cabin 10 are described using FIG. 5. FIG. is a top perspective view of the operator seat in the cabin 10.

The left operating lever 26L is placed in front of the operator seat to the left and the right operating lever 26R is placed in front of the operator seat to the right.

The left operating lever 26L is tilted forward to open the arm 5, and the left operating lever 26L is tilted backward to close the arm 5. Furthermore, the left operating lever 26L is tilted leftward to swing the upper swing structure 3 counterclockwise in a plan view, and the left operating lever 26L is tilted rightward to swing the upper swing structure 3 clockwise in a plan view. Furthermore, the right operating lever 26R is tilted forward to lower the boom 4, and the right operating lever 26R is tilted backward to raise the boom 4. Furthermore, the right operating lever 26R is tilted leftward to close the bucket 6, and the right operating lever 26R is tilted rightward to open the bucket 6.

Figure 6:
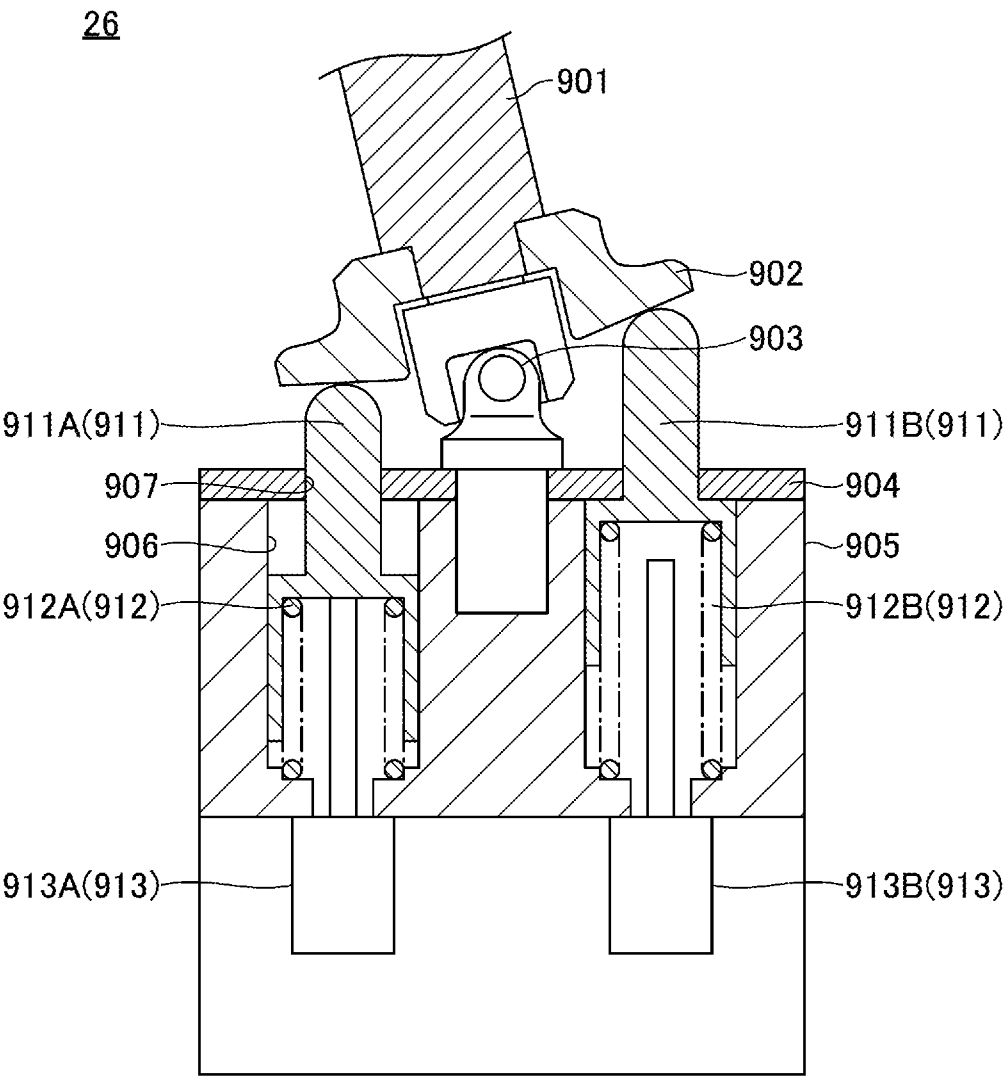
FIG. 6 is a sectional view of an operating device.

Next, examples of the operating device 26 (the left operating lever 26L and the right operating lever 26R) are described using FIG. 6. FIG. 6 is a sectional view of the operating device 26.

The operating device 26 includes a rod-shaped operating lever 901, a cam 902, a universal joint 903, a lid 904, a housing 905, pushers 911 (911A, 911B), return springs 912 (912A, 912B), and stroke sensors 913 (913A, 913B).

The rod-shaped operating lever 901 is attached to the lid 904 and the housing 905 via the universal joint 903. Thereby, the operating lever 901 is configured to be able to tilt forward, backward, leftward, and rightward.

The cam 902 is fixed to a lower portion of the operating lever 901. The lower surface of the cam 902 contacts the upper ends of the pusher 911 protruding from the lid 904.

The lid 904 and the housing 905 accommodate the pushers 911, the return springs 912, the stroke sensors 913, etc. Furthermore, four sets of the pushers 911, the return springs 912, and the stroke sensors 913 are provided, one on the left side, one on the right side, one on the front side, and one on the back side with respect to the operating device 26 as seen from above. FIG. 6 is a sectional view as seen from the back side toward the front and depicts the pusher 911A, the return spring 912A, and the stroke sensor 913A on the left side and the pusher 911B, the return spring 912B, and the stroke sensor 913B on the right side. Furthermore, the pusher 911, the return spring 912 (912C described below with reference to FIG. 7, etc.), and the stroke sensor 913 on the front side and the pusher 911, the return spring 912 (912D described below with reference to FIG. 7, etc.), and the stroke sensor 913 on the back side have the same configuration, and duplicate description thereof is omitted.

The pushers 911 include respective tubular portions placed in chambers 906 of the housing 905 and closed at the top and respective shaft portions placed on the tubular portions and protruding through holes 907 of the lid 904. The tubular portions of the pushers 911 are configured to be vertically movable within the chambers 906 of the housing 905. Furthermore, the tubular portions of the pushers 911 vertically move within the chambers 906 to vertically move the shaft portions of the pushers 911.

The return springs 912 return the tilted operating lever 901 to a neutral position as described below. The return springs 912 are compression springs placed in the tubular portions of the pushers 911, having respective lower ends in contact with the bottom of the chambers 906 and respective upper ends in contact with the ceiling surfaces of the tubular portions of the pushers 911. Thereby, the return springs 912 exert an upward force on the pushers 911.

The stroke sensors 913 detect the amounts of vertical movement of the pushers 911. The stroke sensors 913 are examples of the operation sensor 29 (see FIG. 3) that detects the details of the operator's operation of the operating device 26. The values detected by the stroke sensors 913 are output to the controller 30.

In a state where the operating lever 901 is not operated by the operator, an upward force is exerted on the pushers 911A and 911B on the left side and the right side by the return springs 912A and 912B. Thereby, the head of the pusher 911A pushes the left side of the lower surface of the cam 902 and the head of the pusher 911B pushes the right side of the lower surface of the cam 902 to return the operating lever 901 to a neutral position in the left-right direction. Likewise, an upward force is exerted on the pushers 911 on the front side and the back side by the return springs 912C and 912D. Thereby, the head of the pusher 911 on the front side pushes the front side of the lower surface of the cam 902 and the head of the pusher 911 on the back side pushes the back side of the lower surface of the cam 902 to return the operating lever 901 to a neutral position in the front-back direction.

When the operator operates the operating lever 901, here, when the operator tilts the operating lever 901 leftward as illustrated in FIG. 6, the left side of the lower surface of the cam 902 pushes in the pusher 911A. The stroke sensor 913A can detect the amount of leftward operation of the operating lever 901 by detecting the amount of movement of the pusher 911A. The same applies to the rightward direction, the forward direction, and the backward direction.

Figure 7:
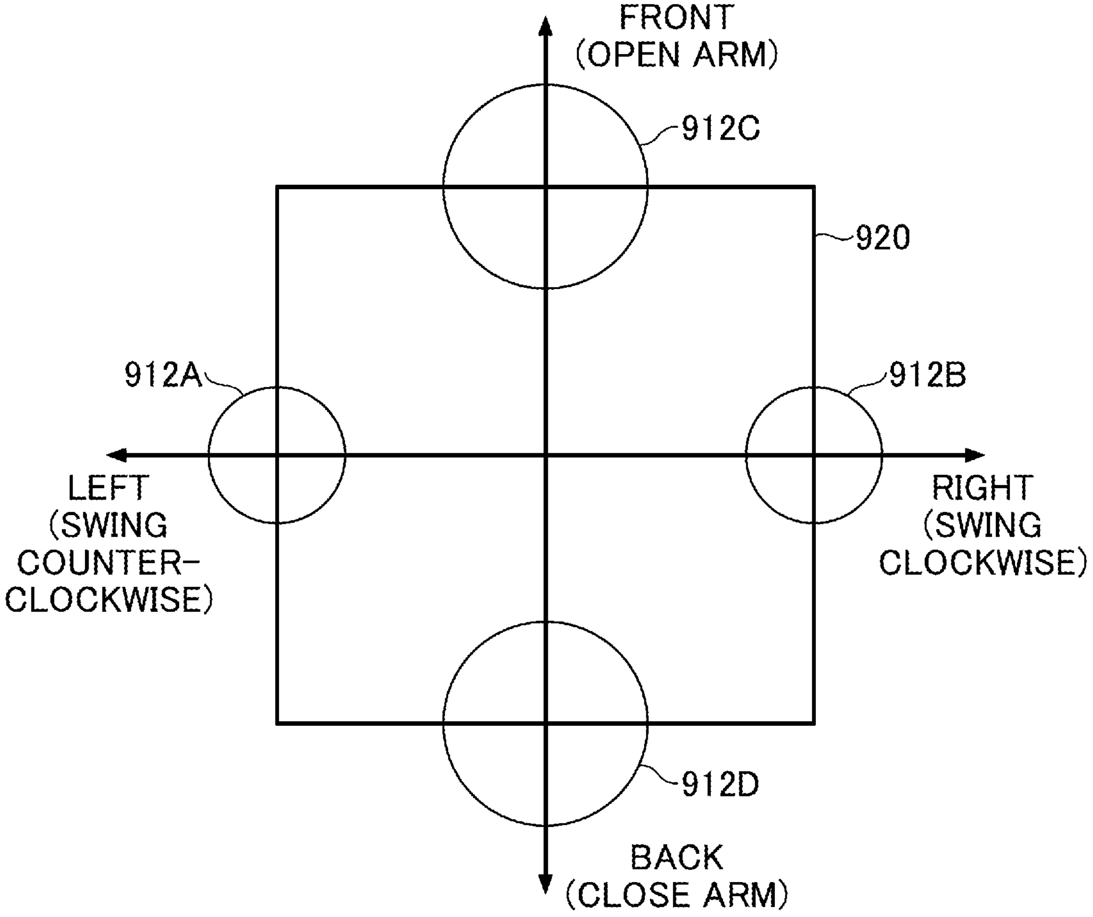
FIG. 7 is a schematic diagram illustrating the strength of return springs on the left side, the right side, the front side, and the back side in the operating device.

FIG. 7 is a schematic diagram illustrating the strength of the return springs 912A through 912D on the left side, the right side, the front side, and the back side in the operating device 26. FIG. 7 illustrates a range 920 within which the operating lever 901 is operable. The operating lever 901 is configured to be operable leftward, rightward, forward and backward in the operable range 920. Furthermore, FIG. 7 schematically illustrates the strength of the return springs 912A through 912D with the size of a circle.

Here, the spring constants of the return springs 912A and 912B on the left side and the right side are set to be smaller than the spring constants of the return springs 912C and 912D on the front side and the back side. Here, when the operator operates the operating lever 901, a force with which the operator pushes the operating lever 901 in the left-right direction is smaller than a force with which the operator pushes the operating lever 901 in the front-back direction. Therefore, by causing the spring constants of the return springs 912A and 912B on the left side and the right side to be smaller than the spring constants of the return springs 912C and 912D on the front side and the back side as illustrated in FIG. 7, it is possible to improve operability for the operator.

When the operator operates the operating lever 901, a force with which the operator pushes the operating lever 901 outward (leftward in the case of the operating lever 901 configured to be operated with the left hand) is smaller than a force with which the operator pushes the operating lever 901 inward (rightward in the case of the operating lever 901 configured to be operated with the left hand). Therefore, the spring constant of the return spring 912 on the outer side may be smaller than the spring constant of the return spring 912 on the inner side to improve operability for the operator.

The spring constants of the return springs 912A through 912D are not limited to the relationship illustrated in FIG. 7 and may be equal.

Figure 8:
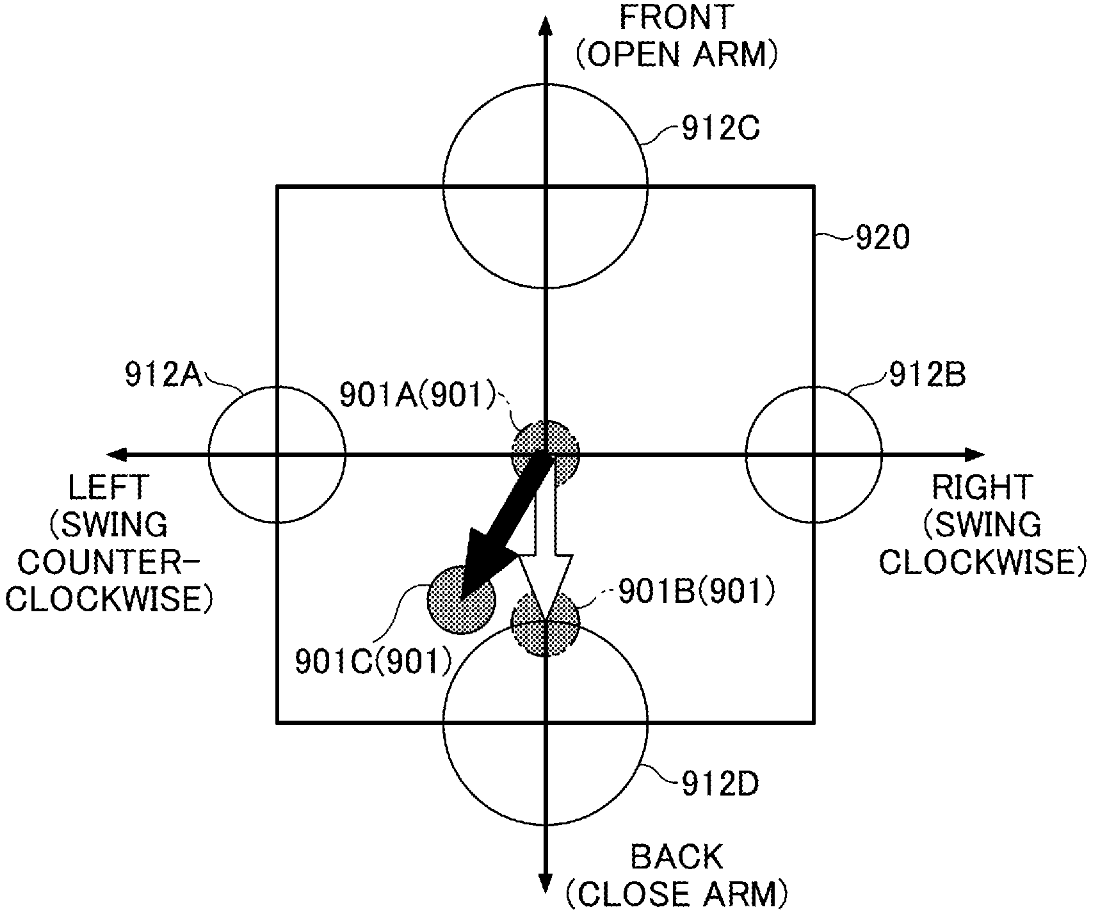
FIG. 8 is a schematic diagram illustrating a movement of an operating lever when an operator tilts the operating lever backward.

FIG. 8 is a schematic diagram illustrating a movement of the operating lever 901 when the operator tilts the operating lever 901 backward.

When the operator operates the operating lever 901 in the direction in which the return spring 912 of a large spring constant is placed, for example, when the operator operates the operating lever 901 from a neutral position 901A toward a back operating position 901B as illustrated in FIG. 8 (see the white arrow), a force to press the operating lever 901 escapes (i.e., is released) in the direction in which the return spring 912 of a small spring constant is placed (leftward or rightward in the example of FIG. 8), so that the operating lever 901 shifts, for example, in the direction indicated by the black arrow. Therefore, the operating lever 901 moves to an operating position 901C. This may cause a swing motion to be accidentally input in the case of performing an arm closing motion, for example.

Even when the return springs 912A through 912D are equal in spring constant, the push back force of the return spring 912D on the back side increases as the amount of the backward tilt of the operating lever 901 from the neutral position 901A increases, so that a force to push the operating lever 901 may escape leftward or rightward to shift the operating lever 901, for example, in the direction indicated by the black arrow. Therefore, the operating lever 901 moves to the operating position 901C. This may cause a swing motion to be accidentally input in the case of performing an arm closing motion, for example.

Furthermore, the operator is more likely to exert force inward (rightward) than outward (leftward) of the neutral position 901A when operating the operating lever 901 (for example, the left operating lever 26L) forward or backward. Therefore, a force to push the operating lever 901 forward or backward may escape rightward to shift the operating lever 901 inward (rightward) of the neutral position 901A. This may cause a swing motion to be accidentally input in the case of performing an arm closing motion, for example.

Furthermore, the operator is more likely to exert force inward (backward) than outward (forward) of the neutral position 901A when operating the operating lever 901 (for example, the left operating lever 26L) leftward or rightward. Therefore, a force to push the operating lever 901 leftward or rightward may escape backward to shift the operating lever 901 inward (backward) of the neutral position 901A. This may cause an arm closing motion to be accidentally input in the case of performing a swing motion, for example.

Furthermore, the operator is more likely to exert force inward (leftward) than outward (rightward) of the neutral position 901A when operating the operating lever 901 (for example, the right operating lever 26R) forward or backward. Therefore, a force to push the operating lever 901 forward or backward may escape leftward to shift the operating lever 901 inward (leftward) of the neutral position 901A. This may cause a bucket closing motion to be accidentally input in the case of performing a boom raising motion, for example.

Furthermore, the operator is more likely to exert force inward (backward) than outward (forward) of the neutral position 901A when operating the operating lever 901 (for example, the right operating lever 26R) leftward or rightward. Therefore, a force to push the operating lever 901 leftward or rightward may escape backward to shift the operating lever 901 inward (backward) of the neutral position 901A. This may cause a boom raising motion to be accidentally input in the case of performing a bucket opening or closing motion, for example.

Figure 9:
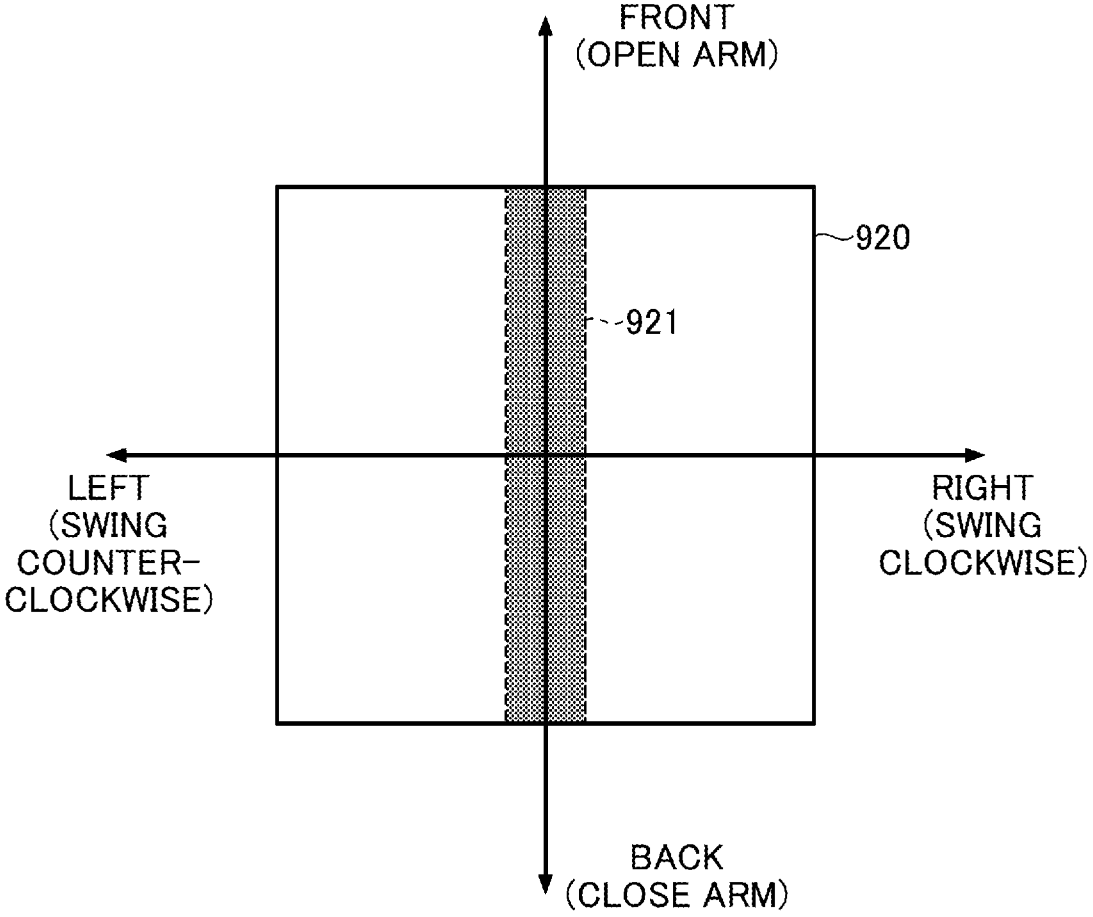
FIG. 9 is a diagram illustrating a dead area in an operation in a left-right direction in a conventional shovel.

FIG. 9 is a diagram illustrating a dead area 921 with respect to operations in the left-right direction in a shovel according to a reference example.

The dead area 921 in which no hydraulic actuators operate in response to the input of the operating device 26 is provided. As illustrated in FIG. 9, in the shovel according to the reference example, the dead area 921 with respect to operations in the left-right direction is constant independent of the amount of operation in the front-back direction. Therefore, for example, as illustrated in FIG. 8, when the operating lever 901 is operated backward to perform an arm closing motion, a swing motion may be accidentally input.

Figure 10:
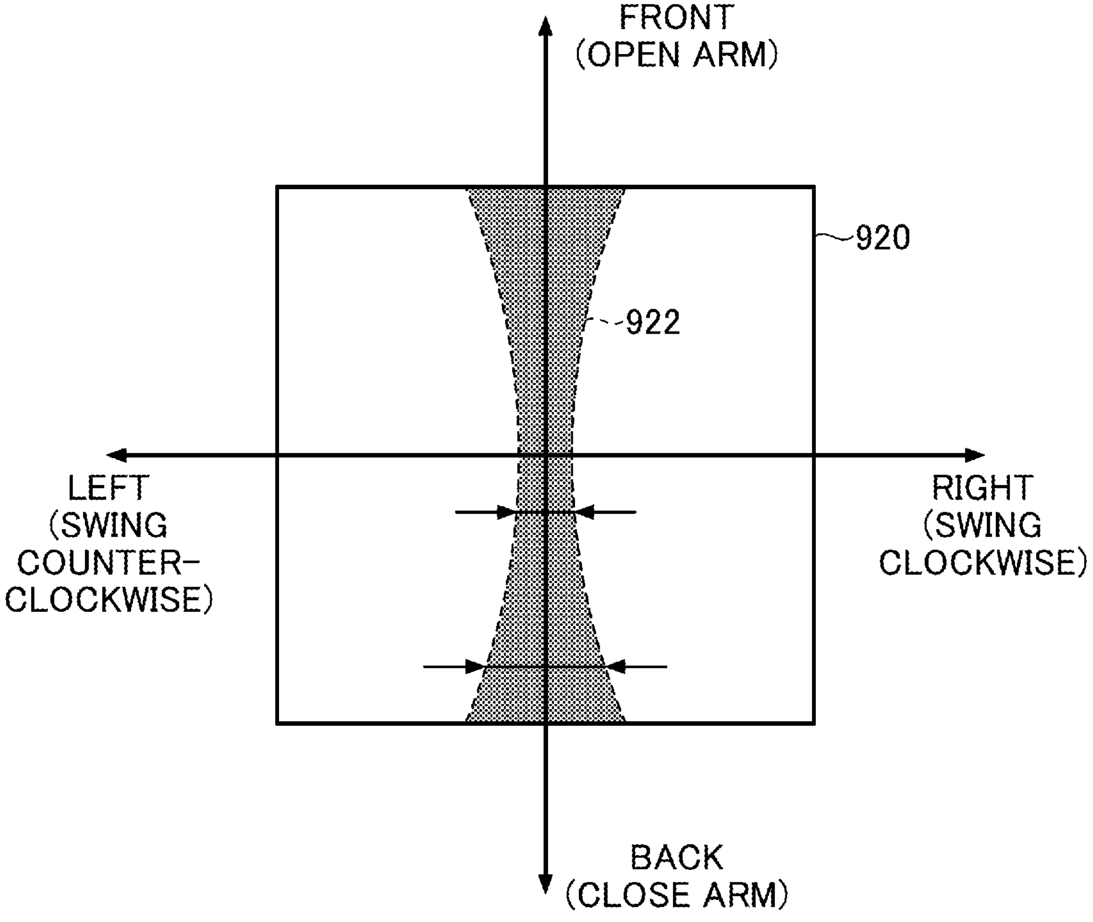
FIG. 10 is a diagram illustrating a dead area in an operation in a left-right direction in the shovel of the embodiment.

FIG. 10 is a diagram illustrating a dead area 922 in operations in the left-right direction in the shovel 100 according to this embodiment.

As illustrated in FIG. 10, according to the shovel 100 of this embodiment, the dead area 922 with respect to operations in the left-right direction is so set as to increase the dead area width with respect to operations in the left-right direction as the amount of operation in the front-back direction increases. The shovel 100 according to this embodiment employs an electric operation system as illustrated in FIG. 4 and can change the dead area width with the control of the controller 30.

That is, in the operating device 26 operable in the left-right direction (one of a first direction or a second direction) and in the front-back direction (the other of the first direction or the second direction), as the amount of operation in the front-back direction increases, the dead area in the left-right direction increases. For example, even when a force to press the operating lever 901 escapes leftward or rightward to accidentally generate a leftward or rightward input in the case of operating the operating lever 901 backward to perform an arm closing motion as illustrated in FIG. 8, it is possible to prevent an unintended swing motion from being performed by increasing the dead area width in the left-right direction in which the force is likely to escape.

Figure 11:
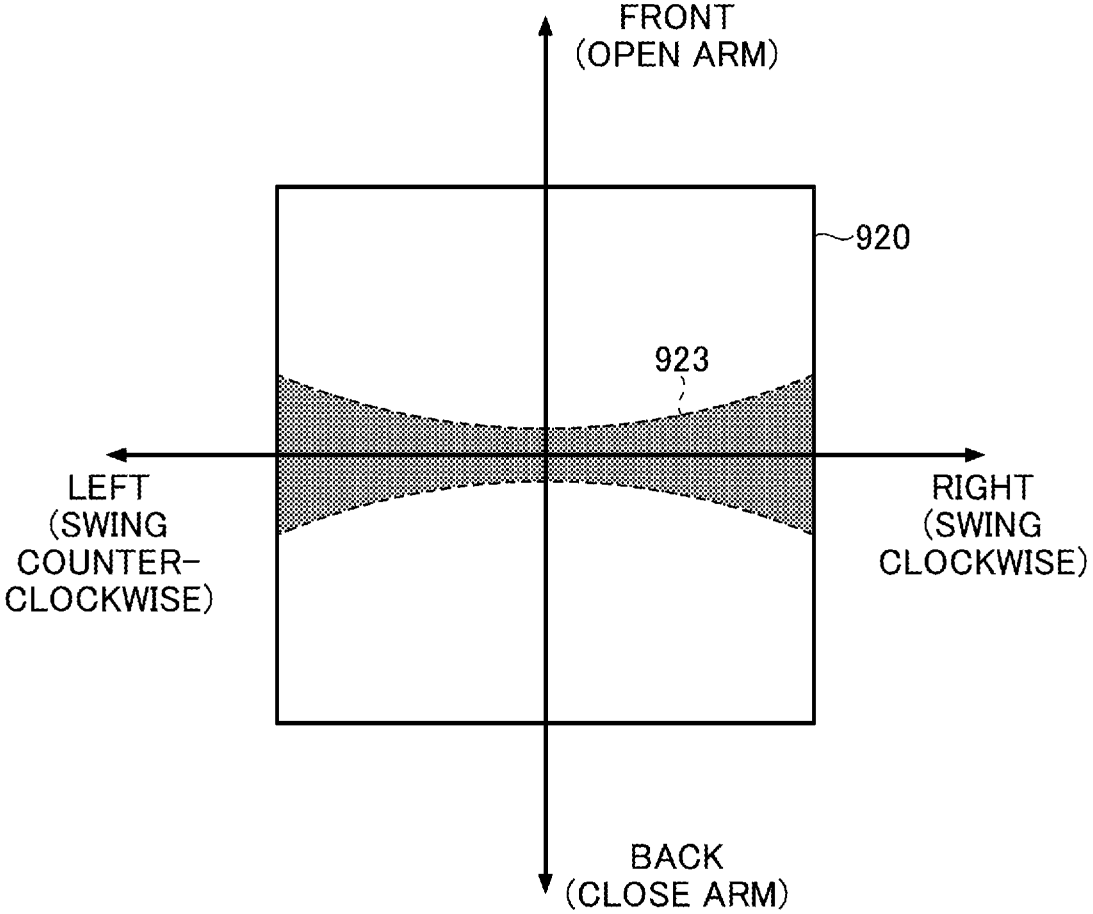
FIG. 11 is a diagram illustrating a dead area in an operation in a front-back direction in the shovel of the embodiment.

FIG. 11 is a diagram illustrating a dead area in operations in the front-back direction in the shovel 100 according to this embodiment.

As illustrated in FIG. 11, according to the shovel 100 of this embodiment, a dead area 923 with respect to operations in the front-back direction may be so set as to increase as the amount of operation in the left-right direction increases. Here, the spring constants of the return springs 912C and 912D on the front side and the back side are greater than the spring constants of the return springs 912A and 912B on the left side and the right side. As a result, even when a force to push the operating lever 901 flows forward or backward during the leftward or rightward tilting of the operating lever 901, it is possible to return the operating lever 901 to a neutral position in the front-back direction with the return springs 912C and 912D of a large spring constant, so that it is possible to prevent an unintended input in the front-back direction. The dead area 923 with respect to operations in the front-back direction may be set to be constant independent of the amount of operation in the left-right direction.

Thus, according to the shovel 100 of this embodiment, in the case of operating the operating lever 901 in one direction, even when the operating lever 901 tilts in another direction in which force is likely to escape, it is possible to make an operation in the other direction insensible. Therefore, it is possible to prevent accidental movement of the shovel 100. This makes it possible to improve the operability of the shovel 100.

Directions in which force is likely to escape are determined based on, for example, the strength of the four return springs 912A through 912D disposed on the left side, the right side, the front side, and the back side of the neutral position 901A. For example, when the return springs 912C and 912D on the front side and the back side have spring constants greater than the spring constants of the return springs 912A and 912B on the left side and the right side, the operating lever 901 is likely to accidentally tilt leftward or rightward when operated forward or backward.

Furthermore, directions in which force is likely to escape may be determined based on, for example, human arm structure. For example, the operator tends to pull the operating lever 901 (the left operating lever 26L) slightly inward (rightward) when tilting the operating lever 901 backward, or the operator tends to pull the operating lever 901 (the right operating lever 26R) slightly inward (leftward) when tilting the operating lever 901 backward. Therefore, the operating lever 901 may be likely to accidentally tilt leftward or rightward when operated backward.

While the above description is given, taking the operating device 26 (the left operating lever 26L) operated with the left hand of the operator as an example, the same may be applied to the operating device 26 (the right operating lever 26R) operated with the right hand of the operator. Furthermore, the relationship between the directions of operation of the operating device 26 illustrated in FIG. 3, etc., and the movements of the hydraulic actuators (the swing hydraulic motor 2A, the boom cylinder 7, the arm cylinder 8 and the bucket cylinder 9) is an example and is not limiting.

Furthermore, while the dead area 923 with respect to operations in the front-back direction is described as increasing as the amount of operation in the left-right direction increases according to the shovel 100 of this embodiment as illustrated in FIG. 11, this is non-limiting, and the dead area 923 in the front-back direction may be constant independent of the amount of operation in the left-right direction.

Furthermore, while the above description is given, taking the case where the spring constants of the return springs 912C and 912D on the front side and the back side are greater than the spring constants of the return springs 912A and 912B on the left side and the right side according to the shovel 100 of this embodiment (see FIGS. 7 and 8), this is non-limiting, and the spring constants of the return springs 912A through 912D may be equal.

In a configuration where the spring constants of the return springs 912A through 912D are equal, the dead area in the left-right direction may be caused to increase as the amount of operation in the front-back direction increases as illustrated in FIG. 10. As a result, for example, even in the case where the push-back force of the return spring 912D increases as the operating lever 901 is tilted backward so that a force to push the operating lever 901 escapes leftward or rightward to accidentally generate a leftward or rightward input when the operating lever 901 is operated backward to perform an arm closing motion, it is possible to prevent an unintended swing motion from being performed by increasing the width of the dead area in the left-right direction in which a force is likely to escape.

Furthermore, in a configuration where the spring constants of the return springs 912A through 912D are equal, the dead area in the front-back direction may be caused to increase as the amount of operation in the left-right direction increases. As a result, for example, even in the case where the push-back force of the return spring 912A on the left side increases as the operating lever 901 is tilted leftward so that a force to push the operating lever 901 escapes up or down to accidentally generate an upward or downward input when the operating lever 901 is operated leftward to perform a counterclockwise motion, it is possible to prevent an unintended arm opening or closing motion from being performed by increasing the width of the dead area in the up-down direction in which a force is likely to escape.

The operating device 26 is described as having a direction in which a force is likely to escape because of its structure (the spring constants of the return springs), but this is non-limiting. It may also be applied to the case where the operating device 26 has a direction in which a force is likely to escape because of its placement. That is, according to the operating device 26 operable in a first direction and a second direction, because of its structure or placement, a force is likely to escape in the second direction when operation is performed in the first direction or a force is likely to escape in the first direction when operation is performed in the second direction. The dead area may be relatively large with respect to the direction in which a force is likely to escape.

The operating device is provided with return springs on the left side, the right side, the front side, and the back side to return an operating lever to its neutral position. Therefore, in the case of diagonally inputting the operating lever, for example, in the case of inputting the operating lever diagonally forward to the right, it is necessary to push two return springs, one on the front side and one on the right side. This requires a large operating force to operate the operating lever and results in a large amount of operation of the operating lever from the neutral position.

Figure 12:
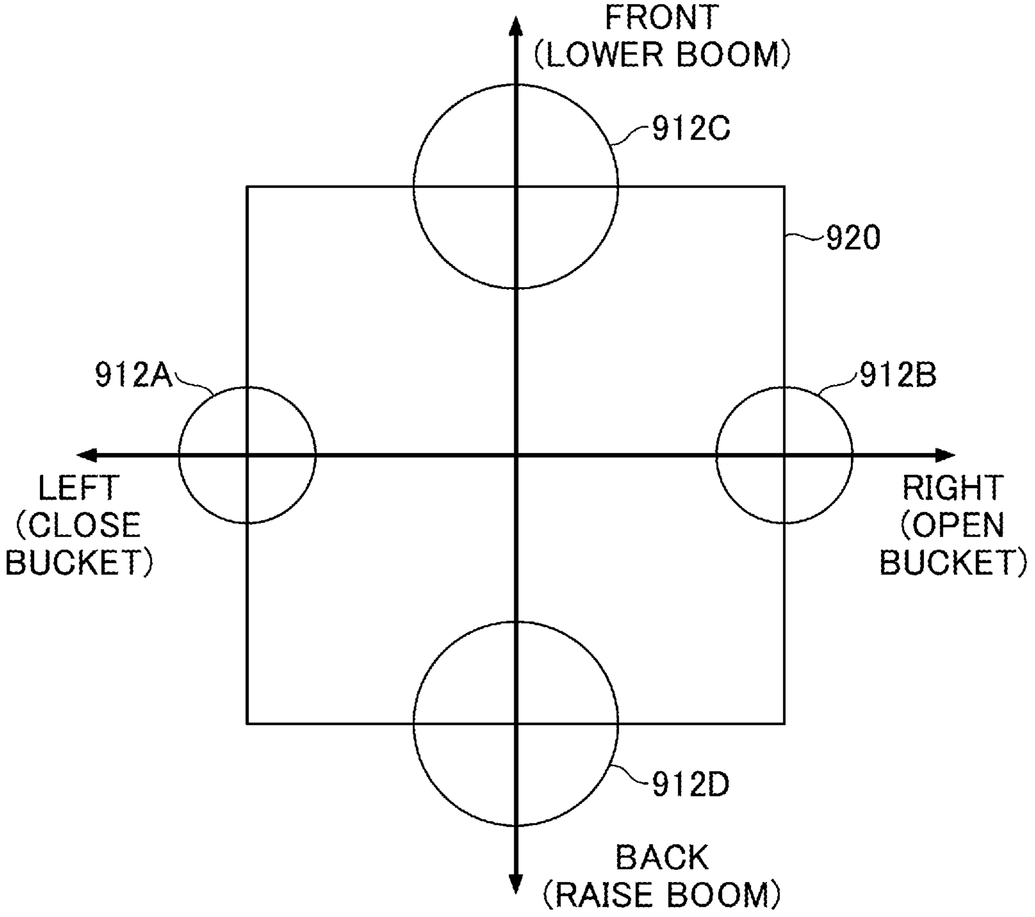
FIG. 12 is a schematic diagram illustrating the strength of return springs on the left side, the right side, the front side, and the back side in the operating device.

FIG. 12 is a schematic diagram illustrating the strength of the return springs 912A through 912D on the left side, the right side, the front side, and the back side in the operating device 26. FIG. 12 illustrates the operable range 920 of the operating lever 901. The operating lever 901 is configured to be operable leftward, rightward, forward, and backward within the operable range 920. Furthermore, FIG. 12 schematically illustrates the strength of the return springs 912A through 912D with the size of a circle.

Here, the spring constants of the return springs 912A and 912B on the left side and the right side are set to be smaller than the spring constants of the return springs 912C and 912D on the front side and the back side. Here, when the operator operates the operating lever 901, a force with which the operator pushes the operating lever 901 in the left-right direction is smaller than a force with which the operator pushes the operating lever 901 in the front-back direction. Therefore, by causing the spring constants of the return springs 912A and 912B on the left side and the right side to be smaller than the spring constants of the return springs 912C and 912D on the front side and the back side as illustrated in FIG. 12, it is possible to improve operability for the operator.

When the operator operates the operating lever 901, a force with which the operator pushes the operating lever 901 outward (leftward in the case of the operating lever 901 configured to be operated with the left hand) is smaller than a force with which the operator pushes the operating lever 901 inward (rightward in the case of the operating lever 901 configured to be operated with the left hand). Therefore, the spring constant of the return spring 912 on the outer side may be smaller than the spring constant of the return spring 912 on the inner side to improve operability for the operator.

The spring constants of the return springs 912A through 912D are not limited to the relationship illustrated in FIG. 12 and may be equal.

Figure 13:
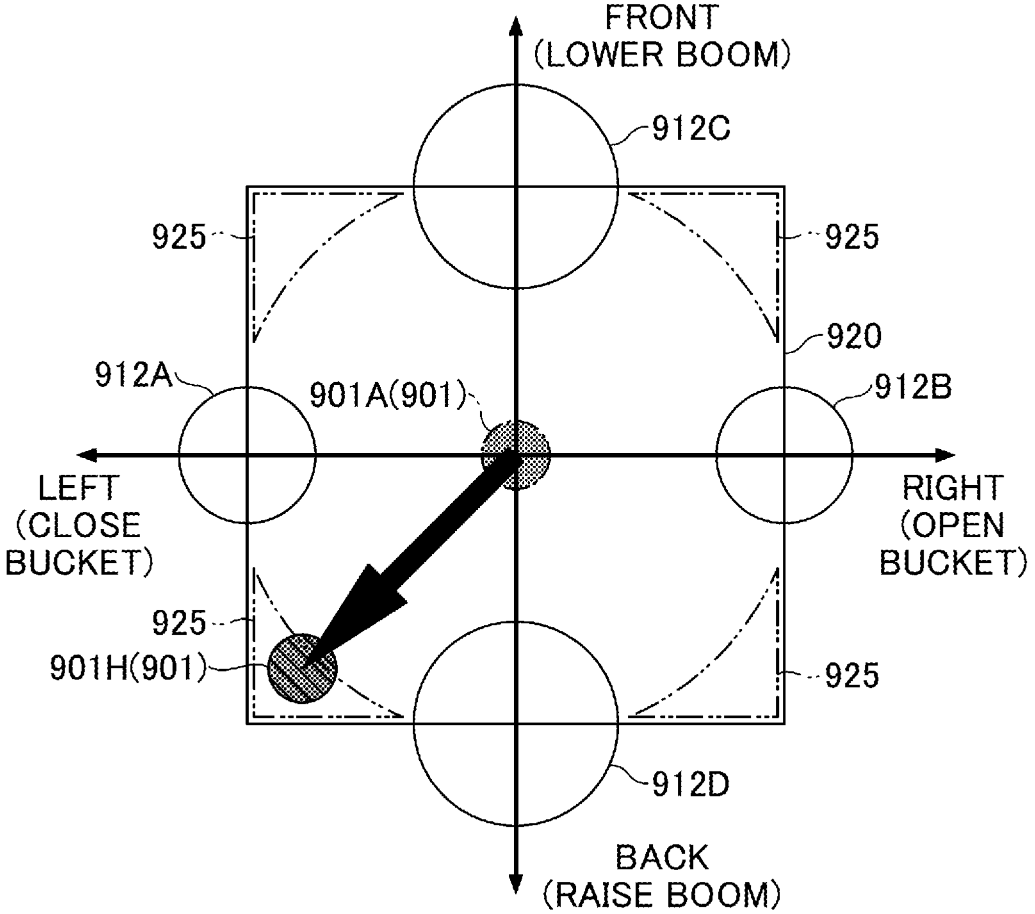
FIG. 13 is a schematic diagram illustrating a movement of the operating lever in the case of simultaneously performing a boom raising motion and a bucket closing motion.

FIG. 13 is a schematic diagram illustrating a movement of the operating lever 901 in the case of simultaneously performing a boom raising motion and a bucket closing motion.

Here, a shovel according to a reference example is described. According to the shovel of the reference example, the controller 30 controls the spool stroke amount of the directional control valve 174 corresponding to the bucket cylinder 9 based on the amount of operation of the operating lever 901 in the left-right direction. Therefore, in the case of maximizing the spool stroke amount of the directional control valve 174, the operating lever 901 is operated to the maximum in the left-right direction of the operable range 920. Furthermore, the controller 30 controls the spool stroke amount of the directional control valve 175 corresponding to the boom cylinder 7 based on the amount of operation of the operating lever 901 in the front-back direction. Therefore, in the case of maximizing the spool stroke amount of the directional control valve 175, the operating lever 901 is operated to the maximum in the front-back direction of the operable range 920.

For example, in the case of simultaneously performing a boom raising motion and a bucket closing motion, the operator tilts the operating lever 901 backward to the left to operate the operating lever 901 from the neutral position 901A to an operating position 901H. In this case, the cam 902 (see FIG. 6) fixed to the operating lever 901 pushes in the return spring 912A and the return spring 912D. Therefore, in the case of diagonally inputting the operating lever 901, two return springs have to be pushed in, which requires a large operating force to operate the operating lever 901 and results in a large amount of operation of the operating lever 901 from the neutral position 901A to the operating position 901H. The same is true for the case of tilting the operating lever 901 backward to the right, forward to the left, and forward to the right. Thus, the operable range 920 of the operating lever 901 includes a difficult operation area 925 where the operating force is large and the amount of operation is large.

According to the shovel of the reference example, the difficult operation area 925 where the operating force is large and the amount of operation is large is also used in operation. Operation in this difficult operation area 925 fatigues the operator.

Figure 14:
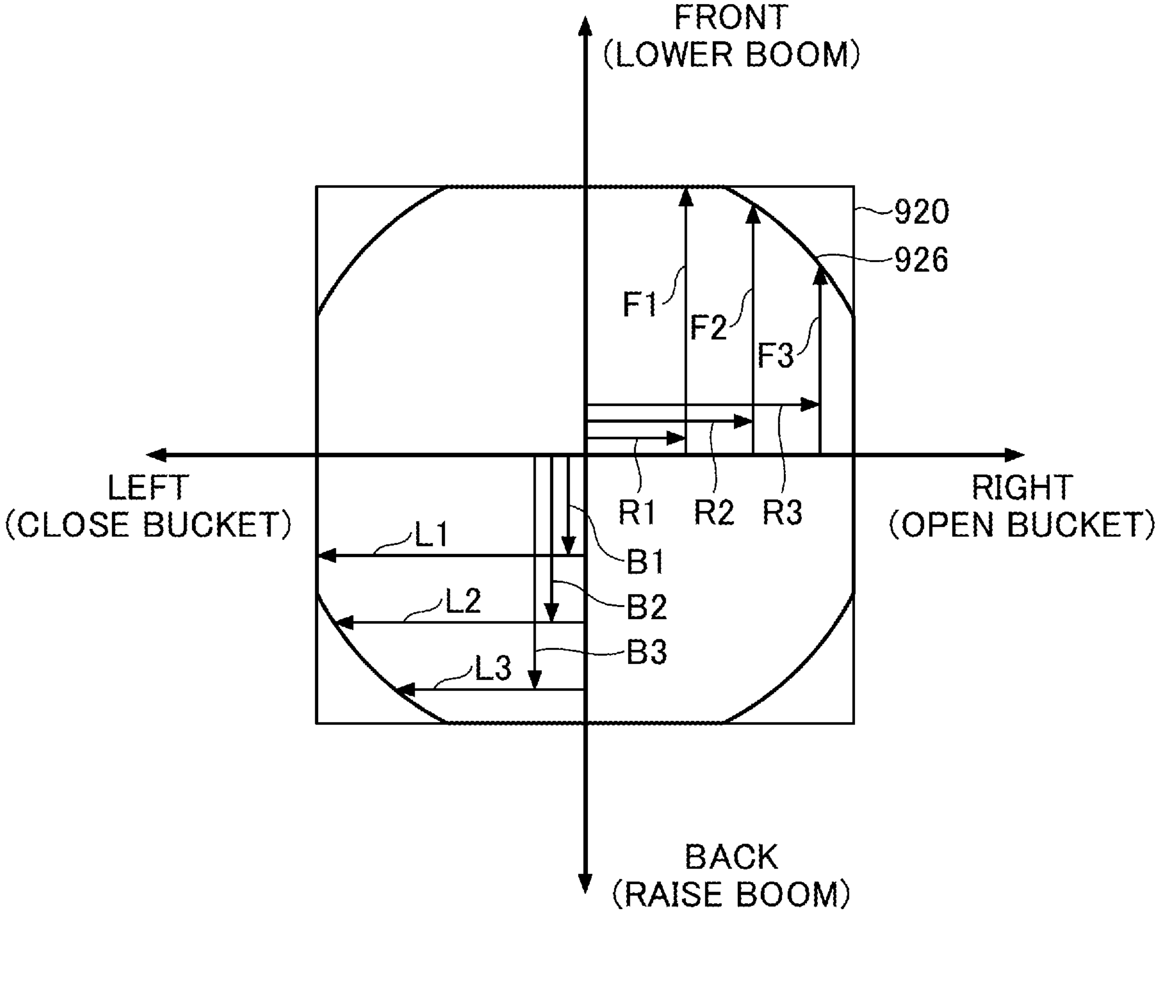
FIG. 14 is a schematic diagram illustrating an example of the operable range of the operating device and a maximum operation amount that maximizes the spool stroke amount of a directional control valve according to the shovel of the embodiment.

FIG. 14 is a schematic diagram illustrating an example of the operable range 920 of the operating device 26 and a maximum operation amount 926 that maximizes the spool stroke amount of a directional control valve according to the shovel 100 of this embodiment.

As illustrated in FIG. 14, the controller 30 is configured such that the maximum operation amount 926 in the left-right direction that maximizes the spool stroke amount (control amount) of the directional control valve 174 corresponding to the bucket cylinder 9 differs according to the amount of operation of the operating lever 901 in the front-back direction. In other words, the relationship between the amount of operation of the operating lever 901 in the left-right direction (for example, second direction) and the maximum operation amount 926 that maximizes the spool stroke amount (control amount) changes according to the amount of operation in the front-back direction (for example, first direction). That is, there is no fixed correspondence between the amount of operation of the operating lever 901 in the left-right direction and the stroke amount (control amount), and the relationship between the amount of operation in the left-right direction (for example, second direction) and the control amount changes according to the amount of operation in the front-back direction (for example, first direction).

For example, when the operating lever 901 is operated backward with an operation amount B1, the maximum operation amount 926 in the leftward direction is an operation amount L1. That is, in response to the operating lever 901 being operated leftward up to the operation amount L1, the controller 30 performs control to maximize the spool stroke amount of the directional control valve 174 corresponding to the bucket cylinder 9.

Furthermore, when the operating lever 901 is operated backward with an operation amount B2 (B2>B1), the maximum operation amount 926 in the leftward direction is an operation amount L2 (L2<L1). That is, in response to the operating lever 901 being operated leftward up to the operation amount L2, the controller 30 performs control to maximize the spool stroke amount of the directional control valve 174 corresponding to the bucket cylinder 9. When the operating lever 901 is tilted further leftward, the spool stroke amount of the directional control valve 174 remains maximized.

Furthermore, when the operating lever 901 is operated backward with an operation amount B3 (B3>B2), the maximum operation amount 926 in the leftward direction is an operation amount L3 (L3<L2). That is, in response to the operating lever 901 being operated leftward up to the operation amount L3, the controller 30 performs control to maximize the spool stroke amount of the directional control valve 174 corresponding to the bucket cylinder 9. When the operating lever 901 is tilted further leftward, the spool stroke amount of the directional control valve 174 remains maximized.

That is, the controller 30 changes the value (for example, L1 through L3) of the maximum operation amount 926 in the left-right direction that maximizes the spool stroke amount of the directional control valve 174 corresponding to the bucket cylinder 9 according to the amount of operation (for example, B1 through B3) of the operating lever 901 in the front-back direction. The controller 30 controls the spool stroke amount of the directional control valve 174 based on the maximum operation amount 926 and the amount of operation of the operating lever 901 in the left-right direction. For example, the controller 30 controls the spool stroke amount of the directional control valve 174 based on the ratio of the amount of operation of the operating lever 901 in the left-right direction to the maximum operation amount 926.

Likewise, the controller 30 is configured such that the maximum operation amount 926 in the front-back direction that maximizes the spool stroke amount (control amount) of the directional control valve 175 corresponding to the boom cylinder 7 differs according to the amount of operation of the operating lever 901 in the left-right direction. In other words, the relationship between the amount of operation of the operating lever 901 in the front-back direction and the maximum operation amount 926 that maximizes the spool stroke amount (control amount) changes according to the amount of operation in the left-right direction. That is, there is no fixed correspondence between the amount of operation of the operating lever 901 in the front-back direction and the stroke amount (control amount), and the relationship between the amount of operation in the front-back direction and the control amount changes according to the amount of operation in the left-right direction.

For example, when the operating lever 901 is operated rightward with an operation amount R1, the maximum operation amount 926 in the forward direction is an operation amount F1. That is, in response to the operating lever 901 being operated forward up to the operation amount F1, the controller 30 performs control to maximize the spool stroke amount of the directional control valve 175 corresponding to the boom cylinder 7.

Furthermore, when the operating lever 901 is operated rightward with an operation amount R2 (R2>R1), the maximum operation amount 926 in the forward direction is an operation amount F2 (F2<F1). That is, in response to the operating lever 901 being operated forward up to the operation amount F2, the controller 30 performs control to maximize the spool stroke amount of the directional control valve 175 corresponding to the boom cylinder 7. When the operating lever 901 is tilted further forward, the spool stroke amount of the directional control valve 175 remains maximized.

Furthermore, when the operating lever 901 is operated rightward with an operation amount R3 (R3>R2), the maximum operation amount 926 in the forward direction is an operation amount F3 (F3<F2). That is, in response to the operating lever 901 being operated forward up to the operation amount F3, the controller 30 performs control to maximize the spool stroke amount of the directional control valve 175 corresponding to the boom cylinder 7. When the operating lever 901 is tilted further forward, the spool stroke amount of the directional control valve 175 remains maximized.

That is, the controller 30 changes the value (for example, F1 through F3) of the maximum operation amount 926 in the front-back direction that maximizes the spool stroke amount of the directional control valve 175 corresponding to the boom cylinder 7 according to the amount of operation (for example, R1 through R3) of the operating lever 901 in the left-right direction. The controller 30 controls the spool stroke amount of the directional control valve 175 based on the maximum operation amount 926 and the amount of operation of the operating lever 901 in the front-back direction. For example, the controller 30 controls the spool stroke amount of the directional control valve 175 based on the ratio of the amount of operation of the operating lever 901 in the front-back direction to the maximum operation amount 926.

Figure 15:
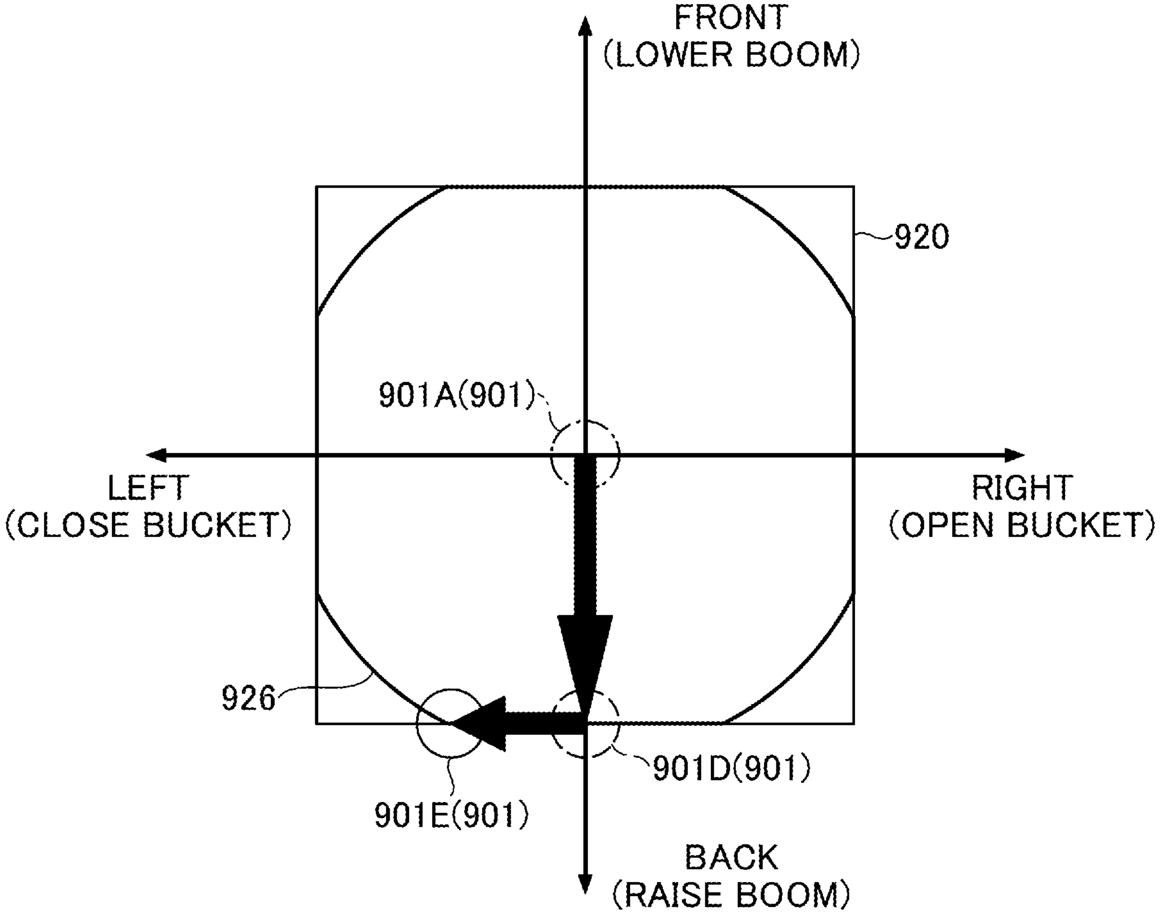
FIG. 15 is a diagram illustrating an example operation of the operating device.

FIG. 15 is a diagram illustrating an example operation of the operating device 26. The operator tilts the operating lever 901 backward from the neutral position 901A to operate the operating lever 901 to an operating position 901D. In response, the controller 30 maximizes the spool stroke amount of the directional control valve 175 corresponding to the boom cylinder 7. In this state, the operator tilts the operating lever 901 leftward to operate the operating lever 901 to an operating position 901E. In response, the controller 30 maximizes the spool stroke amount of the directional control valve 174 corresponding to the bucket cylinder 9.

Figure 16:
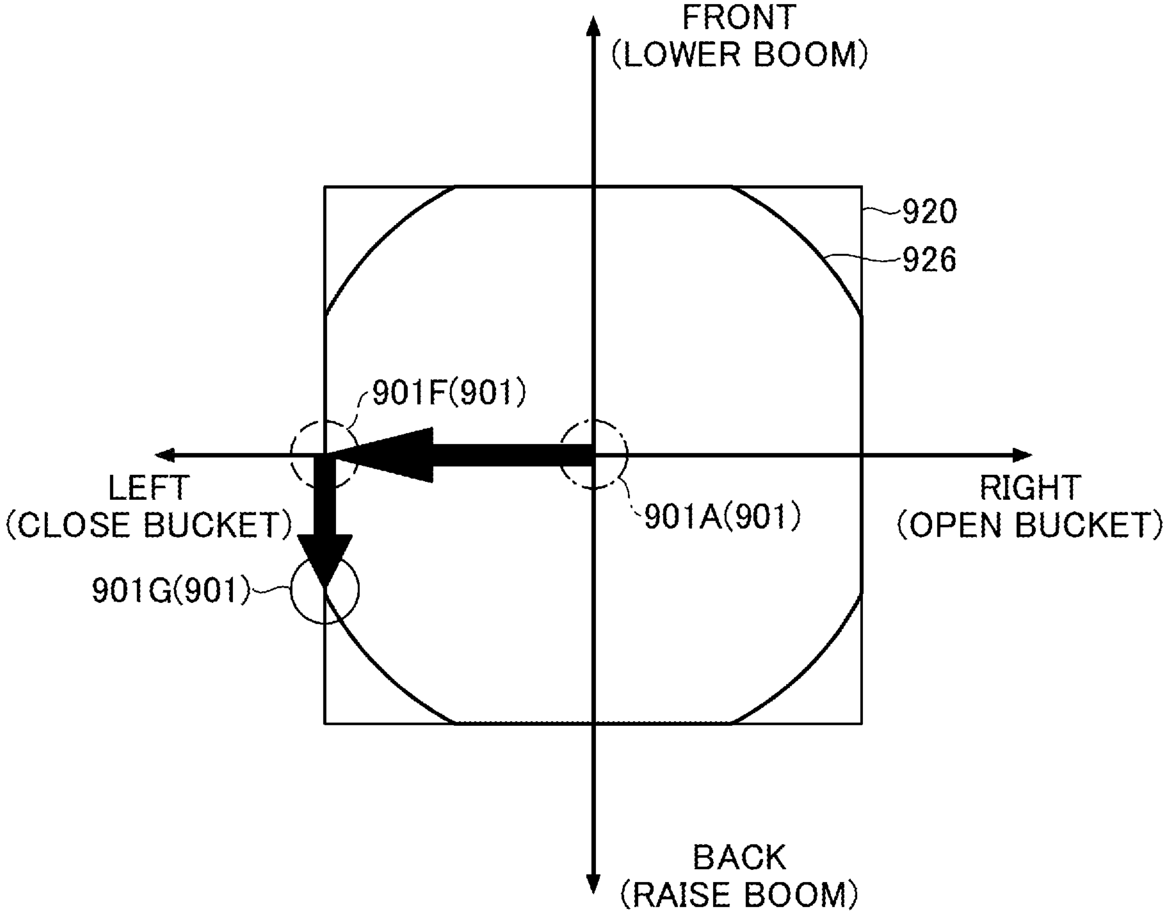
FIG. 16 is a diagram illustrating another example operation of the operating device.

FIG. 16 is a diagram illustrating another example operation of the operating device 26. The operator tilts the operating lever 901 leftward from the neutral position 901A to operate the operating lever 901 to an operating position 901F. In response, the controller 30 maximizes the spool stroke amount of the directional control valve 174 corresponding to the bucket cylinder 9. In this state, the operator tilts the operating lever 901 backward to operate the operating lever 901 to an operating position 901G, thereby maximizing the spool stroke amount of the directional control valve 175 corresponding to the boom cylinder 7.

According to the shovel 100 of this embodiment, it is possible to operate hydraulic actuators such as the boom cylinder 7 and the bucket cylinder 9 without using the difficult operation area 925 (see FIG. 13) where the operating force is large and the amount of operation is large. This makes it possible to reduce the fatigue of the operator and improve operability.

Figure 17:
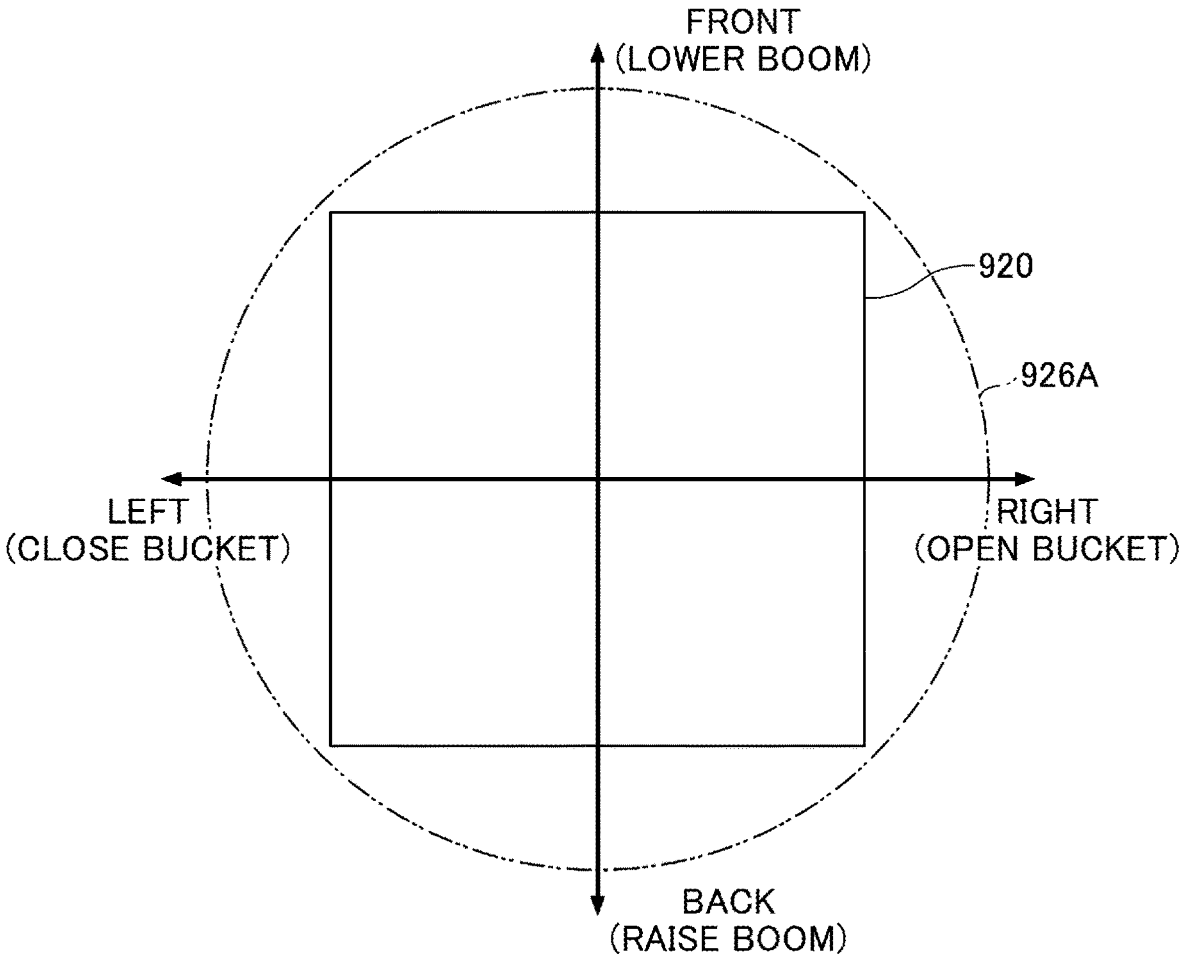
FIG. 17 is a schematic diagram illustrating an example of the operable range of the operating device and a maximum operation amount that maximizes the spool stroke amount of a directional control valve according to the shovel of a variation.

The maximum operation amount 926, which is described, taking the case of being set within the operable range 920 as an example, is not limited to this. FIG. 17 is a schematic diagram illustrating an example of the operable range 920 of the operating device 26 and a maximum operation amount 926A that maximizes the spool stroke amount of a directional control valve according to the shovel 100 of a variation. As illustrated in FIG. 17, the maximum operation amount 926A may be set outside the operable range 920. According to the example illustrated in FIG. 17, the spool stroke amount of a directional control valve is not maximized even when the operating lever 901 is operated to the maximum within the operable range 920.

A control to preferentially supply the flow rate of hydraulic oil to a specific hydraulic actuator during a complex operation of simultaneously moving multiple hydraulic actuators is known. According to the control illustrated in FIG. 17, even when the operating lever 901 is operated to the maximum within the operable range 920, the spool stroke amount of a directional control valve is not maximized, and it is possible to supply hydraulic oil to each of multiple hydraulic actuators. This makes it possible to perform a complex operation of the shovel 100 according to the operation of the operator to improve operability.

That is, according to the shovel 100 of the variation, the controller 30 changes the value of the maximum operation amount 926A in the left-right direction that maximizes the spool stroke amount of the directional control valve 174 corresponding to the bucket cylinder 9 according to the amount of operation of the operating lever 901 in the front-back direction. The controller 30 controls the spool stroke amount of the directional control valve 174 based on the maximum operation amount 926A and the amount of operation of the operating lever 901 in the left-right direction. Furthermore, the controller 30 changes the value of the maximum operation amount 926A in the front-back direction that maximizes the spool stroke amount of the directional control valve 175 corresponding to the boom cylinder 7 according to the amount of operation of the operating lever 901 in the left-right direction. The controller 30 controls the spool stroke amount of the directional control valve 175 based on the maximum operation amount 926A and the amount of operation of the operating lever 901 in the front-back direction. For example, the controller 30 controls the spool stroke amount of the directional control valve 175 based on the ratio of the amount of operation of the operating lever 901 in the front-back direction to the maximum operation amount 926A.

This makes it possible to operate a directional control valve with a small spool stroke amount relative to the operation of the operating lever 901.

Furthermore, part of the maximum operation amount 926 may be set within the operable range 920 and another part of the maximum operation amount 926 may be set outside the operable range 920.

The operating device 26, which is described as being provided in the cabin 10 of the shovel 100, is not limited to this. It may be applied to an operating device for a work machine provided in the cabin of the work machine. It may also be applied to an operating device for a work machine for remotely controlling the work machine from the outside.

What is claimed is:

1. A work machine comprising:

an operating device including an operating lever configured to tilt in a first direction, a second direction, a third direction, and a fourth direction, the first direction and the second direction being opposite to each other, the third direction and the fourth direction being opposite to each other;

a cam fixed to the operating lever; and a first pusher, a second pusher, a third pusher, and a fourth pusher contacting the cam and configured to be pushed by the cam when the operating lever tilts in the first direction, the second direction, the third direction, and the fourth direction, respectively, the first pusher including a single first return spring configured to return the operating lever tilted in the first direction to a neutral position, the second pusher including a single second return spring configured to return the operating lever tilted in the second direction to the neutral position, the third pusher including a single third return spring configured to return the operating lever tilted in the third direction to the neutral position, the fourth pusher including a single fourth return spring configured to return the operating lever tilted in the fourth direction to the neutral position;

a hydraulic pump configured to supply hydraulic oil;

a hydraulic actuator;

a directional control valve configured to control the hydraulic oil flowing from the hydraulic pump to the hydraulic actuator; and a hardware processor configured to control the directional control valve based on an amount of operation of the operating lever, wherein the hardware processor is configured to set a dead area such that the dead area increases with respect to the first direction and the second direction as the operating lever tilts in the second third direction or the fourth direction, the operating lever is configured to tilt with a maximum operation amount to maximize a spool stroke amount of the directional control valve, and the hardware processor is configured to set the maximum operation amount of the operating lever such that the maximum operation amount in each of the first direction and the second direction decreases as the amount of operation in the third direction or the fourth direction increases.

2. The work machine as claimed in claim 1, wherein the hardware processor is configured to set the dead area such that the dead area increases in the first direction and the second direction as the amount of operation increases in the third direction or the fourth direction.

3. The work machine as claimed in claim 1, wherein the first direction and the second direction constitute one of a left-right direction or a front-back direction, and the third direction and the fourth direction constitute the other of the left-right direction or the front-back direction.

4. The work machine as claimed in claim 1, wherein the first direction and the second direction constitute a left-right direction, the third direction and the fourth direction constitute a front-back direction, and the first return spring and the second return spring have a smaller spring constant than the third return spring and the fourth return spring.

5. The work machine as claimed in claim 1, wherein the hardware processor is configured to, when the operating lever tilts in one of the first direction or the second direction while the operating lever tilts in one of the third direction or the fourth direction, control the control amount of the directional control valve with respect to said one of the first direction or the second direction based on the maximum operation amount in said one of the first direction or the second direction and the amount of operation in said one of the first direction or the second direction.

6. The work machine as claimed in claim 1, wherein the operating lever has an operable range in which the operating lever is operable, and the maximum operation amount of the operating lever is set within the operable range.

7. The work machine as claimed in claim 1, wherein the hardware processor is configured to set the dead area such that the dead area increases with respect to the third direction and the fourth direction as the operating lever tilts in the first direction or the second direction.

8. The work machine as claimed in claim 1, wherein the hardware processor is configured to, when the operating lever tilts in one of the first direction or the second direction while the operating lever tilts in one of the third direction or the fourth direction, control the control amount of the directional control valve with respect to said one of the first direction or the second direction based on a ratio of the maximum operation amount in said one of the first direction or the second direction and the amount of operation in said one of the first direction or the second direction.

9. The work machine as claimed in claim 1, wherein a correspondence between the amount of operation of the operating lever in each of the first direction and the second direction and the spool stroke amount of the directional control valve with respect to each of the first direction and the second direction changes according to the amount of operation of the operating lever in the third direction or the fourth direction.

10. An operating device for a work machine, the operating device comprising:

an operating lever configured to tilt in a first direction, a second direction, a third direction, and a fourth direction, the first direction and the second direction being opposite to each other, the third direction and the fourth direction being opposite to each other;

a cam fixed to the operating lever; and a first pusher, a second pusher, a third pusher, and a fourth pusher contacting the cam and configured to be pushed by the cam when the operating lever tilts in the first direction, the second direction, the third direction, and the fourth direction, respectively, the first pusher including a single first return spring configured to return the operating lever tilted in the first direction to a neutral position, the second pusher including a single second return spring configured to return the operating lever tilted in the second direction to the neutral position, the third pusher including a single third return spring configured to return the operating lever tilted in the third direction to the neutral position, the fourth pusher including a single fourth return spring configured to return the operating lever tilted in the fourth direction to the neutral position, wherein a dead area of the operating device is so set as to increase with respect to the first direction and the second direction as the operating lever tilts in the third direction or the fourth direction, the operating lever is configured to tilt with a maximum operation amount to maximize a spool stroke amount of the directional control valve, and the hardware processor is configured to set the maximum operation amount of the operating lever such that the maximum operation amount in each of the first direction and the second direction decreases as the amount of operation in the third direction or the fourth direction increases.

* * * * *